US011207731B2

(12) United States Patent
Govindarajan et al.

(10) Patent No.: US 11,207,731 B2
(45) Date of Patent: Dec. 28, 2021

(54) DEVICES AND METHODS FOR MAKING POLYCRYSTALLINE ALLOYS

(71) Applicant: First Solar, Inc., Tempe, AZ (US)

(72) Inventors: Shrinivas Govindarajan, Perrysburg, OH (US); Michael Latusek, Perrysburg, OH (US); Christopher Wagner, Perrysburg, OH (US); Feng Yan, Perrysburg, OH (US)

(73) Assignee: First Solar, Inc., Tempe, AZ (US)

( * ) Notice: Subject to any disclaimer, the term of this patent is extended or adjusted under 35 U.S.C. 154(b) by 238 days.

(21) Appl. No.: 16/090,697

(22) PCT Filed: Mar. 23, 2017

(86) PCT No.: PCT/US2017/023802
§ 371 (c)(1),
(2) Date: Oct. 2, 2018

(87) PCT Pub. No.: WO2017/176463
PCT Pub. Date: Oct. 12, 2017

(65) Prior Publication Data
US 2019/0151949 A1    May 23, 2019

Related U.S. Application Data

(60) Provisional application No. 62/319,466, filed on Apr. 7, 2016.

(51) Int. Cl.
*B22F 3/23* (2006.01)
*C01G 11/02* (2006.01)
(Continued)

(52) U.S. Cl.
CPC ............... *B22F 3/23* (2013.01); *B22F 3/003* (2013.01); *B22F 3/1039* (2013.01); *B22F 3/24* (2013.01);
(Continued)

(58) Field of Classification Search
CPC .......... B22F 3/23; B22F 3/1039; B22F 3/003; B22F 3/24; B22F 9/16; B22F 2003/248;
(Continued)

(56) References Cited

U.S. PATENT DOCUMENTS 5,330,701 A * 7/1994 Shaw .................. B22F 3/23
419/10
5,382,405 A * 1/1995 Lowrance, II ............ B22F 3/23
264/434
(Continued)

FOREIGN PATENT DOCUMENTS

CN        1789448 A     6/2006
CN     101857227 B     7/2012
(Continued)

OTHER PUBLICATIONS

Combustion synthesis of ZnSe with strong red emission, Liu et al., Materials and Design 97, pp. 33-44, Feb. 18, 2016 (Year: 2016).*
(Continued)

*Primary Examiner* — Rebecca Janssen
(74) *Attorney, Agent, or Firm* — MacMillan, Sobanski & Todd, LLC

(57) ABSTRACT

A process for preparing alloy products is described using a self-sustaining or self-propagating SHS-type combustion process with point-source ignition, preferably a laser, in a pressurized vessel. Binary, ternary and quaternary alloys can be formed with control over polycrystalline structure and bandgap. Methods to tune the bandgap and the alloys formed are described. The alloy products may be doped. Preferably sulfides, tellurides or selenides are formed. Cooling during reaction takes place.

20 Claims, 8 Drawing Sheets
(3 of 8 Drawing Sheet(s) Filed in Color)

(51) Int. Cl.
| | |
|---|---|
| *C04B 35/547* | (2006.01) |
| *C04B 35/65* | (2006.01) |
| *C04B 35/645* | (2006.01) |
| *C01B 19/00* | (2006.01) |
| *C22C 1/04* | (2006.01) |
| *B22F 3/00* | (2021.01) |
| *B22F 3/24* | (2006.01) |
| *B22F 3/10* | (2006.01) |
| *B22F 9/16* | (2006.01) |

(52) U.S. Cl.
CPC .............. *B22F 9/16* (2013.01); *C01B 19/002* (2013.01); *C01B 19/007* (2013.01); *C01G 11/02* (2013.01); *C04B 35/547* (2013.01); *C04B 35/645* (2013.01); *C04B 35/65* (2013.01); *C22C 1/0483* (2013.01); *B22F 2003/248* (2013.01); *B22F 2202/11* (2013.01); *B22F 2203/13* (2013.01); *B22F 2301/30* (2013.01); *B22F 2302/45* (2013.01); *B22F 2303/15* (2013.01); *B22F 2304/10* (2013.01); *B22F 2998/10* (2013.01); *B22F 2999/00* (2013.01); *C01P 2002/54* (2013.01); *C01P 2002/84* (2013.01); *C01P 2004/02* (2013.01); *C04B 2235/40* (2013.01); *C04B 2235/401* (2013.01); *C04B 2235/408* (2013.01); *C04B 2235/428* (2013.01); *C04B 2235/5427* (2013.01); *C04B 2235/5436* (2013.01); *C04B 2235/6567* (2013.01); *C04B 2235/662* (2013.01); *C04B 2235/665* (2013.01); *C04B 2235/762* (2013.01); *C04B 2235/765* (2013.01); *C04B 2235/77* (2013.01)

(58) Field of Classification Search
CPC .............. B22F 2202/11; B22F 2203/13; B22F 2301/30; B22F 2302/45; B22F 2303/15; B22F 2304/10; B22F 2998/10; B22F 2999/00; C01G 11/02; C04B 35/547; C04B 35/65; C04B 35/645; C04B 2235/6567; C04B 2235/5427; C04B 2235/401; C04B 2235/762; C04B 2235/40; C04B 2235/77; C04B 2235/765; C04B 2235/408; C04B 2235/665; C04B 2235/5436; C04B 2235/662; C04B 2235/428; C01B 19/007; C01B 19/002; C01P 2002/54; C01P 2004/02; C01P 2002/84; C22C 1/0483
See application file for complete search history.

(56) References Cited

U.S. PATENT DOCUMENTS

| | | | |
|---|---|---|---|
| 5,460,794 A | 10/1995 | Chung et al. | |
| 5,710,382 A | 1/1998 | Dunmead et al. | |
| 10,026,855 B2 | 7/2018 | Govindarajan et al. | |
| 2003/0106664 A1* | 6/2003 | Yajima | B22D 27/045 164/122.1 |
| 2009/0202414 A1 | 8/2009 | Mukasyan et al. | |
| 2014/0212320 A1 | 7/2014 | Ayers | |
| 2015/0196957 A1* | 7/2015 | Jardine | B22F 3/02 428/613 |
| 2016/0059313 A1* | 3/2016 | Tang | C22C 12/00 419/33 |

FOREIGN PATENT DOCUMENTS

| | | | |
|---|---|---|---|
| CN | 102417168 B | | 8/2013 |
| CN | 103521774 A | | 1/2014 |
| CN | 104860272 A | * | 8/2015 |

OTHER PUBLICATIONS

Korsunska, N.E., Bacherikov, Y.Y., Stara, T.R. et al. Features of ZnS-powder doping with a Mn impurity during synthesis and subsequent annealing. Semiconductors 47, 713-720 (2013). https://doi.org/10.1134/S1063782613050138 (Year: 2013).*

Reshak et al., Effect of increasing tellurium content on the electronic and optical properties of cadmium selenide telluride alloys CdSe1—xTex: An ab initio study, Journal of Alloys and Compounds 509 (2011) pp. 6737-6750 (Year: 2011).*

Strauss et al., "Phase Diagram of the CdTe—CdSe Pseudobinary System", J. Electrochemical Society, (1970), vol. 117, No. 11, pp. 1420-1426.

Li et al., "Phase separation of a microsized powder mixture of Si and SiC by Cu—Si alloying", Chemical Engineering Science, (2015), vol. 127, pp. 25-30.

International Preliminary Report on Patentability, dated Oct. 18, 2018, for international application PCT/US2017/023802 filed on Mar. 23, 2017, published as WO/2017/176463.

International Search Report and Written Opinion, dated Aug. 22, 2017, for international application PCT/US2017/023802 filed on Mar. 23, 2017, published as WO/2017/176463.

Substantive Examination Adverse Report, dated Mar. 3, 2021, Intellectual Property Corporation of Malaysia, Application No. PI2018703656.

* cited by examiner

DEVICES AND METHODS FOR MAKING POLYCRYSTALLINE ALLOYS

CROSS-REFERENCE TO RELATED APPLICATIONS

This is a national phase application of international application PCT/US17/23802, filed under the authority of the Patent Cooperation Treaty on Mar. 23, 2017, published as WO 2017/176463; which claims the benefit of U.S. Provisional Application No. 62/319,466, filed under 35 U.S.C. § 111(b) on Apr. 7, 2016, and incorporated herein by reference.

BACKGROUND OF THE INVENTION

During the fabrication of photovoltaic devices, layers of semiconductor material can be applied to a substrate with one layer serving as a window layer and a second layer serving as the absorber layer. The window layer allows the penetration of solar radiation to the absorber layer, where the solar energy is converted into electrical energy. Some photovoltaic devices use transparent thin films that are also conductors of electrical charge. The conductive thin films may include transparent conductive layers that contain a transparent conductive oxide (TCO), such as fluorine-doped tin oxide, aluminum-doped zinc oxide, or indium tin oxide. The TCO can allow light to pass through a semiconductor window layer to the active light absorbing material and also serve as an ohmic contact to transport photogenerated charge carriers away from the light absorbing material. A back electrode can be formed on the back surface of a semiconductor layer. The back electrode can include electrically conductive material, such as metallic silver, nickel, copper, aluminum, titanium, palladium, chrome, molybdenum or any practical combination thereof. Methods for forming such semiconductor layers include vapor deposition and/or sublimation of metal alloys from particles of an alloy product.

Known prior art processes for making alloys include High-pressure Bridgman (HPVB) and vertical zone melting (HPVZM) growth processes, both of which are described in Kolesnikov, et al., Brookhaven National Laboratory Report BNL-69260 (2002), incorporated by reference. For example, the paper describes manufacturing $Cd_{(1-x)}Zn_xTe$ (x=0.04-0.2), CdSe and ZnSe crystal tapes with sizes up to 120×120×12 mm.

There are numerous challenges in efficiently producing high-quality alloys for use in photovoltaic devices. For many compounds, it is difficult to safely and consistently generate a homogeneous product with predictable crystal structure, granular consistency, and high yield. The raw materials of an alloy may have widely differing melting temperatures, be prone to oxidation, and have toxic properties. During the production of an alloy, product may be lost to sublimation, the density and crystal structure of a produced ingot may be difficult to control, and exothermic reactions may create safety risks and equipment damage.

Accordingly, there is a need for improved methods and devices for producing high quality alloys for use in thin film photovoltaic cells.

BRIEF DESCRIPTION OF THE DRAWINGS

The patent or application file may contain at least one drawing executed in color and/or one or more photographs. Copies of this patent or patent application publication with color drawing(s) will be provided by the Office upon request and payment of the necessary fee.

The accompanying drawings, incorporated herein and forming a part of the specification, illustrate the present invention in its several aspects and, together with the description, serve to explain the principles of the invention. In the drawings, the thickness of the lines and regions may be exaggerated for clarity.

FIG. 10A shows time-resolved photo-luminescence (TRPL).

DETAILED DESCRIPTION

Figure 1:
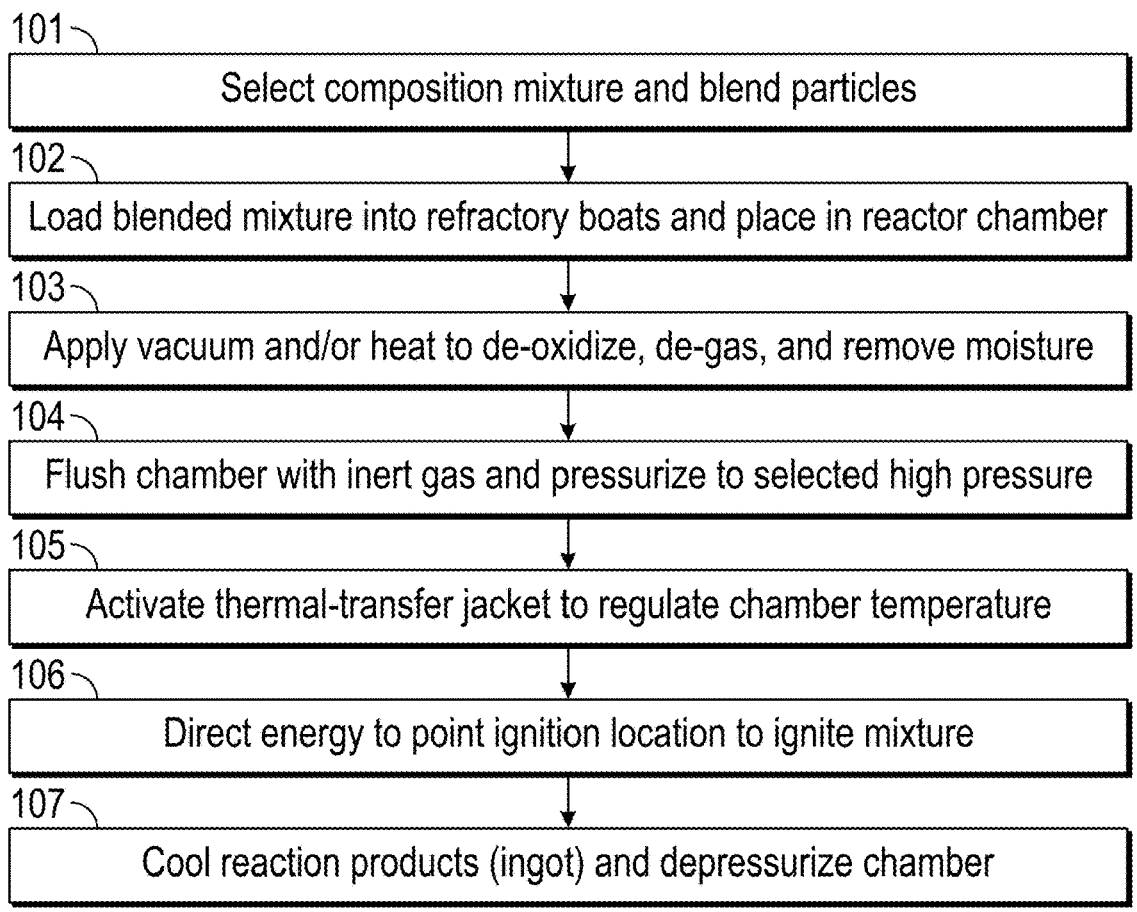
FIG. 1 is a schematic representation of an embodiment of a point-initiated reaction process, such as a laser-assisted pressurized system (LAPS) process.

Described is a self-propagating high temperature synthesis process with point-source ignition in a temperature-adjusted pressure vessel for making highly pure alloys, with or without dopants, for use in photovoltaic devices.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless a context of mutual exclusivity clearly dictates otherwise.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein.

Numerical ranges, measurements and parameters used to characterize the invention—for example, angular degrees, quantities of ingredients, polymer molecular weights, reaction conditions (pH, temperatures, charge levels, etc.), physical dimensions and so forth—are necessarily approximations; and, while reported as precisely as possible, they inherently contain imprecision derived from their respective measurements. Consequently, all numbers expressing ranges of magnitudes as used in the specification and claims are to be understood as being modified in all instances by the term "about." All numerical ranges are understood to include all possible incremental sub-ranges within the outer boundaries of the range. Thus, a range of 30 to 90 units discloses, for example, 35 to 50 units, 45 to 85 units, and 40 to 80 units, etc. Unless otherwise defined, percentages are wt/wt %.

The term "transparent" as used herein in the context of a semiconductor layer refers to material that allows an average transmission of at least 70% of incident electromagnetic radiation having a wavelength in a range from about 300 nm to about 1000 nm. The term "transparent" as used herein in the context of a reactor window refers to material that allows an average transmission of at least 80% of incident electromagnetic radiation of the selected energy input wavelength. For example, a window may be "transparent" to infrared energy at 1070 nm if 80% of radiation from an infrared laser passes through the window. Transparent in the context of the reactor window is thus dependent on the wavelength of the selected energy input source.

In the present disclosure, when a layer is being described as being disposed or positioned "on" another layer or substrate, it is to be understood that the layers can either be directly contacting each other or have one (or more) layer or feature between the layers. Further, the term "on" describes the relative position of the layers to each other and does not necessarily mean "on top of" since the relative position above or below depends upon the orientation of the device to the viewer. Moreover, the use of "top," "bottom," "above," "below," and variations of these terms is made for convenience, and does not require any particular orientation of the components unless otherwise stated. Likewise, a layer that is "disposed on" a different does not necessarily imply that the two layers are in direct contact with one another and may allow for the presence of intervening layers. In contrast, the term "adjacent" is used to imply that two layers are in direct physical contact.

All references cited herein, including books, journal articles, published U.S. or foreign patent applications, issued U.S. or foreign patents, and any other references, are each incorporated by reference in their entireties, including all data, tables, figures, and text presented in the cited references.

Photovoltaic Devices Generally

A photovoltaic device generally includes a transparent conductive layer disposed on a substrate, a first semiconductor layer positioned over the transparent conductive layer, and a second semiconductor layer positioned between the first semiconductor layer and a back metal contact. The two semiconductor layers generally form a heterojunction or are doped to form a heterojunction that produces a current or voltage upon exposure to light. The TCO and back contact are conductors that connect this voltage or current to a load. Usually one of the semiconductor layers is considered the "absorber" layer, and the other may be transparent like a "window" to allow light to pass to the absorber layer. Depending on the configuration, many additional layers may be present, including buffer layers, interfacial layers, high resistance layers, reflective layers, up- or down-converting layers, etc. The following US patents provide some examples of such configuration variances, and the disclosure of each is incorporated by reference: U.S. Pat. Nos. 8,603,253; 8,785,232; 8,748,214; 8,497,151; 8,431,427; 8,741,687; and 8,525,021.

The multiple layers of a photovoltaic device may be applied by the same or different methods. Methods used may include chemical vapor deposition (CVD), spray pyrolysis, electro-deposition, sputtering, close-space sublimation (CSS), and any other known process useful for forming thin-film semiconductors.

Alloy Compositions

Alloys that can be manufactured according to the present invention include at least binary, ternary, and quaternary alloys. Alloys are compositions of two, three, four, or more elements that contain substantially only those elements with only minor impurities.

Non-exclusive examples of a binary alloys useful in photovoltaic devices include compositions consisting essentially of: cadmium and selenium (cadmium selenide—CdSe); cadmium and sulfur (cadmium sulfide—CdS); cadmium and tellurium (cadmium telluride—CdTe); zinc and selenium (zinc selenide—ZnSe); zinc and sulfur (zinc sulfide—ZnS); and zinc and tellurium (zinc telluride—ZnTe).

Dopants, although often intentionally included, are in a sense impurities in the alloy. Thus, an alloy "consisting essentially of" elements A and B includes an A-B alloy doped with one or more dopants. Dopants generally do not exceed molar or atomic concentrations of about 10,000 ppm (or 1 at %), typically only about 1,000 ppm (or 0.1 at %). Thus, "consisting essentially of" is defined herein to exclude an additional alloying element over 1 at % of the composition, but not to exclude dopants comprising about or less than 1 at %. By convention, dopants are written in empirical formulae in parentheses and are not counted in the atomic percent of the overall alloy formulation. Tables A, B, and C below illustrate.

An example of a ternary alloy is a composition consisting essentially of cadmium, selenium and tellurium. Other elements may be selected to form ternary alloys. In some alloys, cadmium and selenium may be combined with a third different element X or Y to form an alloy of the formula $CdSe_uX_{(1-u)}$, or $Cd_wY_{(1-w)}Se$, wherein X is an element selected from group VIA; Y is an element selected from group IIB; u and w are numbers from 0.05 to 0.99. In certain embodiments, u or w is a number from about 0.1 to about 0.8. In certain embodiments, Y is selected from Zn, and Hg; and in certain embodiments X is selected from S and Te. Some representative ternary alloys are set forth in Table A.

TABLE A

Representative ternary alloys

| $CdSe_uX_{(1-u)}$ or $Cd_wY_{(1-w)}Se$ | | note |
|---|---|---|
| CdSeTe | X = Te; u = 0.05 to 0.95 | |
| CdSeTe(Cu) | X = Te; u = 0.05 to 0.95 | copper dopant |
| CdSSe | X = S; u = 0.05 to 0.95 | |
| CdSeTe(Sb) | X = Te; u = 0.05 to 0.95 | antimony dopant |
| CdHgSe | Y = Hg; w = 0.05 to 0.95 | |
| CdZnSe | Y = Zn; w = 0.05 to 0.95 | |

A quaternary alloy consists essentially of four elements, for example: cadmium, selenium and third and forth different elements X, X', Y or Y' to form a quaternary alloy of the formula:

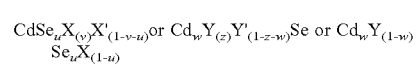

$CdSe_uX_{(y)}X'_{(1-y-u)}$ or $Cd_wY_{(z)}Y'_{(1-z-w)}Se$ or $Cd_wY_{(1-w)}Se_uX_{(1-u)}$ in which X and X' are different and independently selected from elements in group VIA; Y and Y' are different and independently selected from elements in group IIB; u and w are independently a number from 0.05 to 0.98; and v and z are independently a number from 0.001 to 0.75. In certain embodiments, u and w are numbers from about 0.1 to 0.9; and in certain embodiments, v and z are numbers from about 0.01 to 0.5. In certain embodiments, Y and Y' are selected from Cd, Zn, and Hg; and in certain embodiments, X and X' are selected from S and Te. Some representative quaternary alloys are set forth in Table B.

TABLE B

Representative quaternary alloys

| | $CdSe_uX_{(v)}X'_{(1-v-u)}$ or $Cd_wY_{(z)}Y'_{(1-z-w)}Se$ or $Cd_wY_{(1-w)}Se_uX_{(1-u)}$ | note |
|---|---|---|
| CdSSeTe | X = S, X' = Te; u = 0.05 to 0.95, v = 0.01 to 0.5 | |
| CdSSeTe (Cu) | X = S, X' = Te; u = 0.05 to 0.95, v = 0.01 to 0.5 | copper dopant |
| CdSSeTe (Sb) | X = S, X' = Te; u = 0.05 to 0.95, v = 0.01 to 0.5 | antimony dopant |
| CdZnHgSe | Y = Zn, Y' = Hg; w = 0.05 to 0.95, z = 0.01 to 0.5 | |
| CdZnSeTe | X = Te; Y = Zn; w = 0.05 to 0.95, u = 0.05 to 0.95 | |
| CdZnSSe | X = S; Y = Zn; w = 0.05 to 0.95, u = 0.05 to 0.95 | |
| CdHgSeTe | X = Te; Y = Hg; w = 0.05 to 0.95, u = 0.05 to 0.95 | |
| CdHgSSe | X = S; Y = Hg; w = 0.05 to 0.95, u = 0.05 to 0.95 | |
| CdZnSSe(Cu) | X = S; Y = Zn; w = 0.05 to 0.95, u = 0.05 to 0.95 | copper dopant |
| CdHgSeTe(Sb) | X = Te; Y = Hg; w = 0.05 to 0.95, u = 0.05 to 0.95 | antimony dopant |

Alloy compositions may be doped or undoped. If doped, dopants may be provided as elements from groups IA, IIIA, IVA, VA, VIA, VIIA, IB, and IIB, or as compounds formed from these elements and other elements selected from groups VIA or IIB. Representative dopants may include Na, Li, K, B, Al, Ga, In, Tl, Ge, Sn, Pb, P, As, Sb, F, Cl, Br, I, Cu, Ag, and Au and compounds of these with elements from groups VIA or IIB. For example, dopant particles may consist of Cu alone, $Cu_2Te$, Sb alone, $Sb_2Te_3$, Pb alone, PbTe, As alone, $As_2Te_3$, Cl alone, $CdCl_2$, Ag alone, $Ag_2Te$, etc. It should be understood that elements and compounds from groups VIA and IIB may be either an alloying component (e.g. if used at more than 1 at %) or a dopant (e.g. if used at 1 at % or less.).

Reaction Vessels

Direct thermal synthesis has been used to form alloys used in the production of solar panels. One form of this synthesis technique is also known in academic literature as "Self-Propagating High-Temperature Synthesis" or SHS. This technique works well for systems where a sufficient amount of heat is released during the reaction such that the heat causes the reaction to self-propagate through the reactant mass until conversion of the reactants to the desired product is complete.

Despite the highly exothermic nature of the reactions, SHS reactions are often characterized by a relatively high input energy requirement before the reaction initiates. As such, processing and handling of the blended raw material powders is safe at ambient conditions. However, once enough energy is provided to start the reaction, even in a small (sub-millimeter) area, the reaction will self-propagate at a rapid rate.

The high heat generated during the reaction can vaporize some products and reactants. This detrimentally impacts product yield and consistency. Without wishing to be bound by theory, Applicants have found that in order to produce high density polycrystalline ingots, rather than a low density powdery material, it is beneficial for the product to reach its melting point while staying below its boiling point. If a product has a melting point higher than its boiling point under reaction conditions, such as CdS at atmospheric pressure, yield is decreased and ingots composed of fine dust material is produced.

To improve yield and consistency for products useful in photovoltaic manufacturing, applicants have designed a Point-Initiated Pressurized Exothermic Reactor/Reaction (PIPER). A PIPER system is designed with an energy source that is capable of initiating a reaction in just a localized portion (or multiple such localized portions) of the reaction mixture, not throughout the entire reaction mixture, as with a furnace. Embodiments of the PIPER system have been tested and include embodiments using a laser as the point-source of energy to initiate the exothermic self propagating reaction. This system is referred to herein as a laser assisted pressurized system (LAPS).

Figure 3:
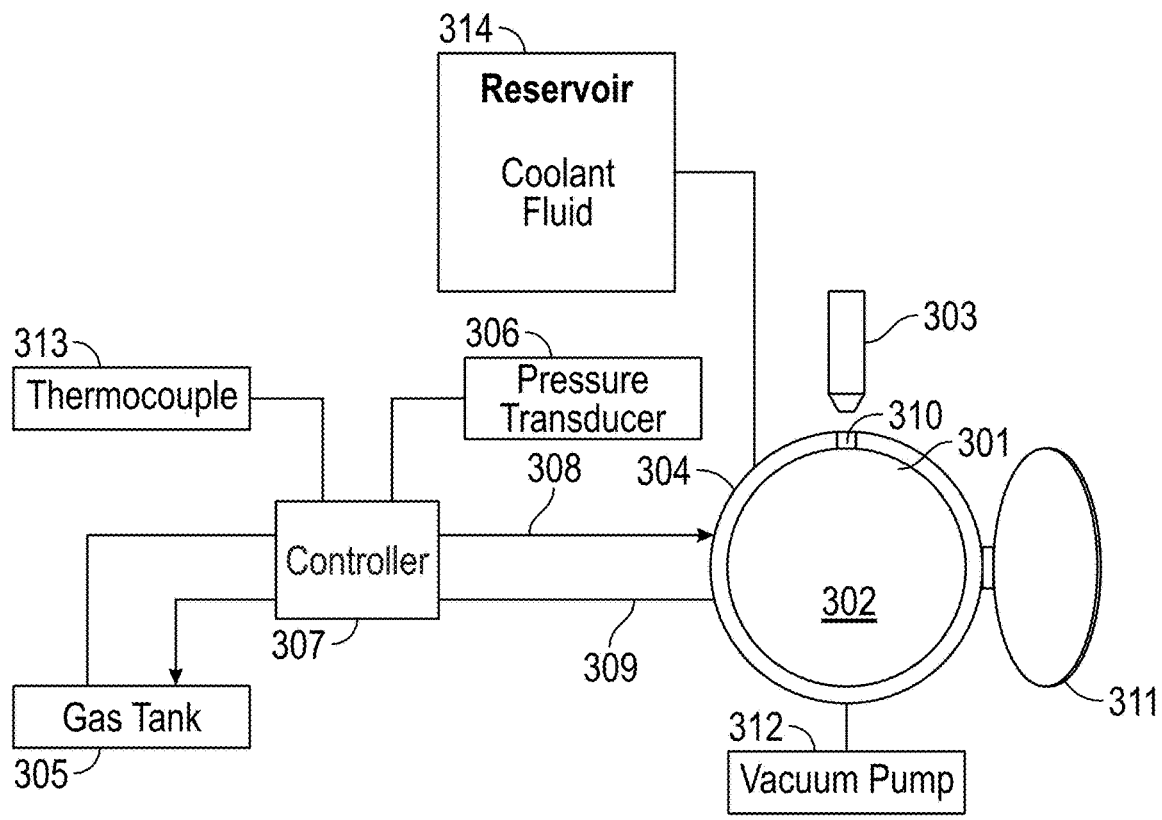
FIG. 3 shows a front view of an embodiment of a pressure reactor as further described in the examples.
Figure 4:
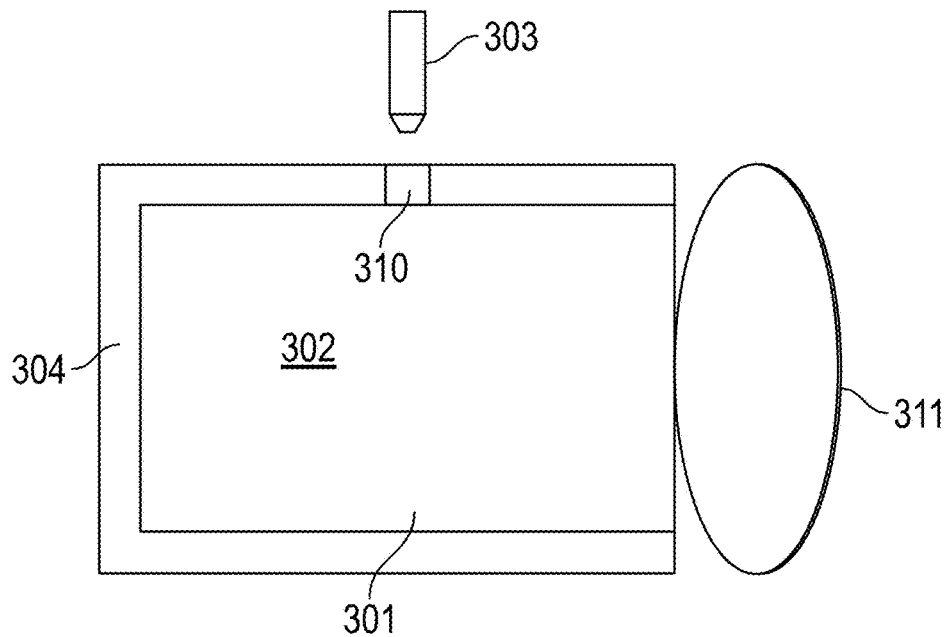
FIG. 4 shows a side view of the pressure reactor.
Figure 5:
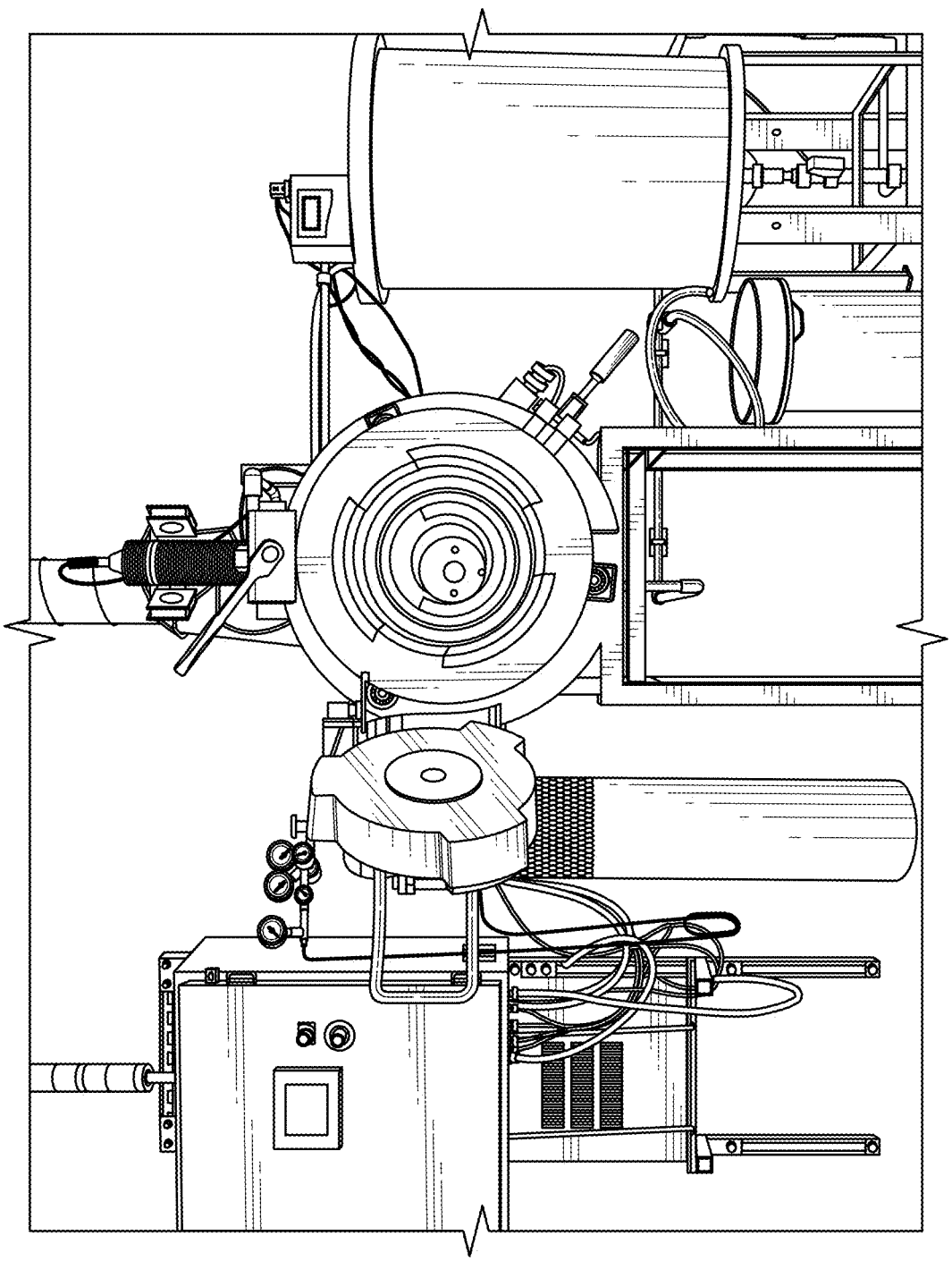
FIG. 5 shows a front view of an embodiment of a pressure reactor.

As shown in FIGS. 3-5, an exemplary LAPS embodiment has a vessel 301 with an interior chamber 302 configured for pressurization. A laser point ignition source 303 is configured to direct radiation to heat one or more locations in the chamber. The vessel 301 has an enclosed cooling jacket or heat-transfer jacket 304 circulating a heat-conducting fluid around the vessel 301, exterior to the chamber 302.

A gas tank 305 is attached to provide a substantially inert pressurized atmosphere to the pressure chamber 302. An inert atmosphere can prevent or minimize oxidation, thereby increasing yield and purity.

In an exemplary embodiment, the vessel 301 is stainless steel with a pressure rating at or above 1500 psi. In an embodiment, the reactor vessel 301 is cylindrical with a hinged access door 311 at one axial end. The reactor may be provided with a safety rupture disk. In an embodiment, the pressure reactor has gas inlet and exhaust outlet ports which can be open or closed. In an embodiment, the pressure reactor is connected to a vacuum pump to degas the chamber.

A pressure transducer 306 is connected to a controller 307. The controller 307 regulates gas flow into the chamber 302 through at least one gas inlet 308 and regulates gas flow out of the chamber through at least one gas outlet 309. A sight window 310, such as a clear quartz window, is provided in a side wall of the chamber 302 and a laser 303 is mounted adjacent the window and configured to direct energy through the window to a location for placing a refractory vessel. In another embodiment, a sight window is optional and a filament or cartridge heater in the chamber produces the ignition energy which is connected to a controller 307 on the vessel 301 exterior by an electrical feed-through.

Embodiments of the system include connecting the reactor to a vacuum pump 312 to degas the chamber and remove moisture. In some embodiments, the chamber 302 is encircled by a heating jacket to expedite moisture removal. In some embodiments, the system further comprises a thermocouple 313 connected to the controller 307.

While the embodiment shown in FIG. 3 depicts a laser for the point ignition source, other methods may be used to produce the localized heating demanded of a point-initiated reaction. For example, other point ignition sources include using one or more of: a maser, an ignition coil, a spark generator, a high temperature flame, a plasma gun, and immersion of a heated rod into the powders.

The heat sink, or cooling jacket, reduces the temperature of the chamber. In an embodiment, the heat sink comprises a series of tubular heat exchangers disposed within or around the walls of the reaction chamber, and a coolant fluid configured for flowing through said tubular heat exchangers. The cooling jacket may use water or another coolant fluid 314, such as ethylene glycol, to circulate through the jacket 304. In some embodiments the function of the cooling jacket and warming jacket are encompassed a single heat-transfer jacket 304 for which the temperature of the circulating fluid 314 is selected. In an embodiment, the pressure chamber 302 is substantially surrounded by heat-transfer jacket 304 having tubular conduits through which the fluid 314 flows. In some embodiments the heat-transfer fluid recirculates. In a recirculation system, cool fluid enters the jacket 304 of the vessel 301, removes heat from the exterior of the chamber 302 by conduction, and the fluid exits the jacket to a heat exchange structure, such as fins or coils, where the fluid is cooled before re-entering the jacket. In some embodiments, pressurization or depressurization of the chamber 302 is used to alter the chamber temperature.

In an embodiment, the pressure reactor further comprises one or more components selected from: a controller; a pressure transducer; a first laser; a second laser; a first sight window; a second sight window; a gas inlet to the chamber; a gas outlet from the chamber; a thermocouple; a cartridge heater; a maser; an ignition coil; a spark generator; a high temperature flame source; a plasma gun; a vacuum pump configured to degas the chamber; a heat-transfer jacket; a cooling jacket; a heating jacket; a heat sink; and a heat exchanger.

In an embodiment, the reaction chamber is pressurized to a pressure selected from: 1-200 bar (100-20,000 KPa); 5-100 bar (500-10,000 KPa); 10-100 bar (1,000-10,000 KPa); 40-90 bar (4,00-9,000 KPa); 10-50 bar (1,000-5,000 KPa); 30-80 bar (3,000-8,000 KPa); 20-30 bar (2,000-3,000 KPa); and 25-30 bar (2,500-3,000 KPa).

Provided is a pressure reactor for forming a metallic alloy comprising: reactor walls defining a sealable reaction chamber; a source of pressurizing gas in selective fluid communication with the reaction chamber for selectively pressurizing the reaction chamber to a desired pressure; a point ignition source configured to direct heat to at least one location in the reaction chamber to initiate a self-propagating reaction; and a heat sink configured to cool the reaction chamber.

In an embodiment the pressure reactor has a transparent window in the reactor wall and the point ignition source is at least one laser configured to direct at least one laser beam through the transparent window and into the reaction chamber.

Reaction Mixtures

The bandgap of a photovoltaic layer or component produced from an alloy is manipulated primarily by selection of the alloy composition, including dopants, and secondarily controlled by the conditions of alloying and annealing.

Fine particles of selected reactants are blended into a substantially homogenous reaction mixture that is pressurized and ignited to induce a SHS process. The fine particles of cadmium, selenium, tellurium, sulfur, zinc, copper, or other elements, are referred to collectively as the "reactant particles." Reactant particles are generally provided as relatively pure elemental particles, not as compounds of two or more elements. If dopants are desired, the dopants are provided as "dopant particles" of elemental or compound forms as noted above.

The reactant particles and dopant particles should be of a size range that affords good surface area for reaction. Applicants have found that a particle size range from 1 to about 1000 microns (micrometre, μm) is suitable. In some embodiments the reactant particles are less than about 200 μm, for example from about 1 to about 50 μm. Particle size distributions are easily managed by milling or grinding, and sieving through standard mesh sieves until a relatively uniform distribution is obtained. For example, a standard #400 mesh sieve passes particles that are about 37 μm or smaller, whereas a standard #325 mesh sieve passes particles that are about 45 μm or smaller. Larger mesh sizes, if desired, are also well known. The ideal size may vary depending on the composition of the powder blend including reactants, selected dopants, and any quenchant particles.

Along with cooling the vessel and regulating the pressure during the reaction, quenchant particles may optionally also be used in controlling the SHS reaction. Quenchant particles are essentially compounds that are the products that are to be made in the SHS reaction. As such, their presence controls the reaction and they may be used to lower the adiabatic temperature to a point that is less than or equal to the melting point of the alloy. Quenchant particles, when used, may of similar size or larger than the reactant particles and dopant particles, for example less than about 500 μm, or from about 10 to about 300 μm. Quenchant particles, when used, are added to the reaction mixture at weight percentages from about 1% to about 70%, or from about 5% to about 60%. Balancing the relative amounts of quenchant particles with reactant particles in the reaction mixture can aid in controlling and "quenching" the SHS reaction.

Table C, below, provides certain illustrative representations of reaction mixtures that include reactants, quenchants (in parentheses) and, in some cases marked by an asterisk, dopants.

TABLE C

Illustrative reactant mixtures and resulting alloy products

| Reaction Mixture with (Quenchant) and dopant* | Alloy Product |
| --- | --- |
| 0.45Cd + 0.45Se + (0.55 CdSe) | CdSe |
| 0.45Cd + 0.45Se + (0.5 CdSe + 0.05CdS) | $CdS_{.05}Se_{.95}$ |
| 0.6Cd + 0.6Te + (0.15CdSe + 0.25CdTe) | $CdSe_{.15}Te_{.85}$ |
| 0.45Cd + 0.45Se + (0.55 CdSe) + 0.01Cu* | CdSe(0.01Cu) |
| 0.65Cd + 0.5Te + (0.1CdSe + 0.25CdTe) + 0.05Sb*Te$_2$ | $CdSe_{0.1}Te_{.85}$(0.05 Sb) |
| 0.65Cd + 0.55Te + (0.1CdSe + 0.25CdTe) + 0.05Cu*$_2$Te | $CdSe_{0.1}Te_{.85}$(0.1Cu) |
| 0.65Cd + 0.6Te + (0.1CdSe + 0.25CdTe) + 0.05S | $CdSe_{0.1}Te_{.85}S_{.05}$ |

In an embodiment, the blended mixture of particles comprises one or more substances selected from: cadmium; selenium; tellurium; sulfur; zinc; mercury; copper; a dopant; and a quenchant. In an embodiment, the first metallic element is selected from the group consisting of: cadmium and zinc; and the second element is selected from the group consisting of: selenium; tellurium; sulfur; zinc; and mercury. In an embodiment, the blended mixture further comprises at least one substance selected from the group consisting of: Cd; Se; Te; S; Bi; Cl; Cu; Sb; Hg; In; Ga; Ag; Au; Br; I; As; Pb; Na; Li; K; B; Al; Tl; Ge; Sn; P; F; Zn; CdS; CdTe; CdSe; Cu$_2$Te; ZnTe; a quenchant; and a dopant.

In an embodiment, a size of the particles of the first element and the particles of the second element ranges from about: 1-300 μm; 1-250 μm; 1-200 μm; 1-150 μm; 1-100 μm; 1-50 μm; less than 1000 μm; less than 800 μm; less than 500 μm; less than 300 μm; less than 200 μm; than 150 μm; less than 100 μm; or less than 50 μm.

In an embodiment, the blended mixture of particles consists of powdered solids. In an embodiment, the particles are composed of highly pure (~99.999%) raw materials. In an embodiment, the blended mixture of particles is substantially homogenous.

In an embodiment, the blended mixture of particles further comprises macroscopic pellet solids.

In an embodiment, the blended mixture of particles further comprises an ignition-promoter. In an embodiment, the blended mixture of particles comprises a non-homogenous mixture, wherein the mixture has at least two portions, wherein one portion is an ignition-promoting layer on a top surface of the mixture of particles. In an embodiment, the blended mixture of particles comprises a non-homogenous mixture, wherein the mixture has a single or multiple "sandwich" layers consisting of an ignition-promoting layer between two layers of reactants (or vice versa), with the overall composition tuned as needed. In an embodiment, the ignition-promoter comprises a metallic element having a high heat of reaction. In an embodiment, the blended mixture of particles further comprises an ignition layer comprising particles having physical properties to facilitate the ignition and propagation of an exothermic reaction.

Self-Sustaining High-Temperature Synthesis

Self-Propagating or Self-Sustaining High-temperature Synthesis (SHS) is a process to synthesize materials which have exothermic formation reactions, and has been used for ceramics and metal alloys. Early work in the area of SHS, also known as combustion synthesis, was started by using mixtures of metals with boron, carbon, and silicon. Since 1976, a large number of universities and laboratories worldwide have been engaged in the research and development of SHS.

In SHS, the energy input is applied to the reactant sample to increase the local temperature to the ignition temperature of the mixture. Thereafter, the reaction does not need further energy input due to its self-sustaining nature. The generated heat passes on to the next portion of unreacted composition and raises its temperature until its ignition is again achieved. The heat and reaction propagate like a wave through the unreacted mixture leaving behind the combustion products.

Materials that have a low heat of reaction and low adiabatic temperature are not suitable for production by SHS because the reaction does not self-propagate. The adiabatic temperature refers to the theoretical temperature reached by a reaction with no heat exchange to the environment. Even materials that have a very high heat of reaction may be poor candidates for traditional furnace-heated SHS if either: (a) they have an adiabatic temperature in excess of the boiling point of the product; or (b) the product has a melting point higher than its boiling point under ambient conditions. However, these compounds, including CdS, are well suited for point-initiated self-sustaining reactions, such as the LAPS process. Even compounds that are capable of being made by a traditional furnace-heated SHS may benefit from the invention in terms of higher yield or higher purity. For example, all of the alloys in Table D (below) except CdS can be efficiently produced at 1 atm pressure but can benefit from slightly higher yields under moderate pressures.

The choices of pressure and temperature control are highly dependent on the physical properties of the particular reactants and alloy products, such as melting point and boiling point, and also on the adiabatic temperature of the process. For example, if the alloy melting point is below the adiabatic temperature, one might add quenchant particles to lower the adiabatic temperature to at or below the melting point. If the boiling point at atmospheric pressure is low relative to the alloy melting point, one might increase the reactor pressure to a value that exceeds the vapor pressure at the expected adiabatic temperature, optimally about 10× that vapor pressure. Adding pressure beyond what is needed to melt the alloy mostly helps increase product yield, but with diminishing returns as the reactor pressure goes beyond 10× of the vapor pressure. In some embodiments a reactor pressure of 300 to 600 psi has been found suitable for CdTe, CdSe, and CdSeTe.

Process conditions will vary depending on exactly what parameters are to be optimized. For example, CdTe ingots would best use 0% quenchant particles and a pressure of 300 psi if highest density was to be optimized, while cost-minimized CdTe may use 25% quenchant particles and ambient pressure.

TABLE D

Physical Properties of Selected Elements and Compounds

| | Melting Point: (1 atm) | Boiling Point: (1 atm) | Heat of Reaction, STP: | Adiabatic Temperature ($T_o$ = 25° C.): |
|---|---|---|---|---|
| CdTe: Cadmium Telluride | 1092° C. | 1130° C. | −100.8 kJ/mol | 1092° C. |
| CdSe: Cadmium Selenide | 1268° C. | 1559° C. | −144.8 kJ/mol | 1931.8 |
| CdS: Cadmium Sulfide | 1475° C. | 1260° C. | −162 kJ/mol | 2200° C. |
| ZnTe: Zinc Telluride | 1238° C. | 1295° C. | −117 kJ/mol | 1295° C. |
| Cd: Cadmium | 321° C. | 765° C. | | |
| Te: Tellurium | 450° C. | 990° C. | | |
| Se: Selenium | 221° C. | 685° C. | | |
| S: Sulfur | 115° C. | 445° C. | | |
| Zn: Zinc | 420° C. | 907° C. | | |

Laser-Assisted Pressurized Synthesis (LAPS)

An example of a point-initiated pressurized exothermic reactor system includes embodiments using a laser as the point-source of energy to initiate the exothermic self propagating reaction. This system, the laser assisted pressurized system for self propagating reactions, LAPS, process is illustrated generally in FIG. 1. While an exemplary process is discussed and depicted in a sequence, it is understood that certain steps are optional or may be performed in another sequence.

A composition of the mixture is selected 101. The composition includes at least two elements as reactant particles and may include additional reactant particles, dopant materials, and optional quenchant particles. The selected component particles are provided in a fine particulate form, as discussed above. The particulates are blended to form a substantially homogenous mixture.

A loading step is performed 102. As is customary in SHS reactions, the blended fine particle reactants are added to refractory vessels. The vessels may be made of graphite or quartz for example and are sometimes referred to as "boats." In an embodiment, a boat may be approximately 10×10×25 cm and hold 1-5 kg of reactants. Rather than placing the boats into a furnace, as customary in SHS, the boats are loaded into the LAPS pressure chamber. The chamber is closed and sealed.

An optional pretreatment step may be performed 103. Pretreatment may include deoxidation, degassing, and moisture removal. It may be performed by applying vacuum, applying inert or reducing gasses, applying heat, or a combination of these.

A pressurization step is performed 104. A gas is pumped into the chamber to increase the chamber pressure. In some embodiments, the chamber is flushed with an inert gas and the gas selected for pressurization is non-reactive or inert. Selection of gas for the reaction is determined based on the particular reactants selected and taking thermal conductivity of the gas into consideration. Exemplary gasses include, but are not limited to: nitrogen, argon, and helium.

Temperature regulation is activated 105. Heat transfer between the chamber and thermal-transfer jacket or heat-transfer jacket provides temperature regulation. Cooling processes may be started before, during, or after the pressurization step or the ignition step. In an embodiment, pressurization of the tank has a warming effect which is lessened by cool fluid circulating through the heat-transfer jacket. In an embodiment, pressurization of the tank has a warming effect which is maintained or increased prior to ignition by hot fluid circulating through the heat-transfer jacket.

A point-initiated ignition step is performed 106. Energy sufficient to initiate a self-propagating reaction is directed only to a localized point or part of the mixture that is less than the whole. The energy can be directed to a single point source or to multiple point sources. In an embodiment, a laser beam initiates the reaction. The method further comprises selecting a laser having a suitable wavelength and power level for the reactants; i.e. one having a wavelength that can be absorbed by the bandgap of the material to be heated. In an embodiment, the laser is a 12 W 532 nm green laser. In another embodiment, the laser is a 10 W 1064 nm infrared laser. In a further embodiment, the laser has a wavelength between 300-1500 nm.

Also provided is a method of forming a metallic alloy comprising: pressurizing a blended mixture of particles of a first metallic element and particles of at least one second element, to a pressure of about 1 to 200 bar (100 to 20,000 KPa) in a pressure reactor; and initiating a self-propagating reaction by directing a laser beam on to the powder mixture inside the pressure reactor, and during self-propagation of the reaction, cooling the reactor to remove heat generated from the reaction, thereby forming the compound alloy.

In an embodiment, the point energy source is a laser. In an embodiment, the laser has a wavelength selected from: 300-1500 nm; 400-1100 nm; 532 nm; 1070 nm; and 1064 nm. In an embodiment, the laser has a power selected from: 1-100 W; 10-50 W; 5-20 W; 5-15 W; 5-10 W; and 10-15 W. In an embodiment, the laser is a green laser. In an embodiment, the laser is an infrared laser.

In an embodiment, the point energy source is selected from the group consisting of: a cartridge heater; a maser; an ignition coil; a spark generator; a high temperature flame source; and a plasma gun.

The temperature of the vessel is regulated and actively cooled 107 by the cooling jacket. Use of the cooling jacket, along with the use of high pressures, reduces or eliminates the need for quenchant particles in the reaction mixtures. The cooling of the reactor may be initiated, before ignition, after the reaction mixture ignites, after the reaction progresses to completion, or after a predetermined period of time. In a standard SHS process, active chamber heating is generally needed in order to initiate the reaction, however, using LAPS, a high-energy laser pulse is sufficient to ignite the powder mixture, even with surrounding chamber temperatures, at initiation, at or below 30° C. The reaction quickly progresses to completion within seconds or minutes depending on the reaction mixture and volume.

Once the reactants have reacted, the reaction product, or ingot, is cooled and the chamber is depressurized. The depressurization can be used to accelerate the cooling process. Cooling also may take place in an inert environment, or in an inert and reducing environment in some embodiments. Cooling rate may be accomplished by any number of methods, including but not limited to, passive cooling, ambient air cooling, depressurization cooling, forced air cooling, and enhanced or chilled forced air cooling. After the chamber is depressurized and cooled to at or near ambient temperature, the ingot is removed.

In an embodiment, at the completion of the reaction, the chamber is promptly cooled 107 to quench the reaction and produce crystalline phase(s) in the ingot. Depending on the reactants, the nature of the crystalline phase may be purely cubic, purely hexagonal, or a mixture of both, as is discussed below. In an embodiment, the pressure chamber is substantially surrounded by heat-transfer jacket having tubular conduits through which fluid flows. In some embodiments the heat-transfer fluid recirculates. In a recirculation system, cool fluid enters the jacket, removes heat from the chamber, and the fluid exits the jacket to a heat exchange structure, such as fins or coils, where the fluid is cooled before re-entering the jacket.

In an embodiment the average cooling rate of the chamber temperature is 10-50° C./minute. In an embodiment of the method the heat-transfer fluid enters the jacket at 20-35° C. and exits at greater than 90° C., at a flow rate of greater than 10 L/minute. In some embodiments, the heat-transfer fluid enters the jacket at 20-35° C. and exits at greater than 90° C., at a flow rate in the range of 10-100 L/minute.

One large advantage of the PIPER or LAPS process for making alloys is the high yield and high purity product obtained. In an embodiment, the post-compounding yield of the $CdSe_xTe_{(1-x)}$ alloy is about 99%. In an embodiment, the post-compounding yield of the $CdSe_xTe_{(1-x)}$ alloy is 95%-100%. In and embodiment, the post-compounding yield of the $CdSe_xTe_{(1-x)}$ alloy produced by the LAPS process is about 99%, and the post-annealing yield following the stabilization heat treatment of the $CdSe_xTe_{(1-x)}$ alloy, is about 99%.

In an embodiment of the $CdSe_xTe_{(1-x)}$ alloy, the alloy is undoped and impurities are present, if at all, in a concentration less than 0.001 wt %. In an embodiment of the $CdSe_xTe_{(1-x)}$ alloy, the alloy further comprises a dopant as is discussed below.

In an embodiment, the method of forming the metallic alloy further comprises cooling the reactor during the reaction and chilling the pressure reactor at the completion of the self-propagating reaction. In an embodiment, a cooling jacket is used to lower the chamber temperature. In an embodiment, depressurization is used to lower the chamber temperature. In an embodiment, the chamber temperature is cooled to less than 30° C. within 1 hour of the completion of the reaction In an embodiment, the chamber pressure is at ambient pressure within 1 hour of the completion of the reaction.

In some embodiments, an inert environment is maintained. An inert environment may include argon, nitrogen or other inert gases. The environment may be maintained as an inert and reducing environment in some embodiments. A reducing environment may include hydrogen gas or other reducing gases, such as hydrocarbons, carbon monoxide, carbon dioxide-carbon monoxide mixtures, or mixtures with inert gases.

Figure 6A:
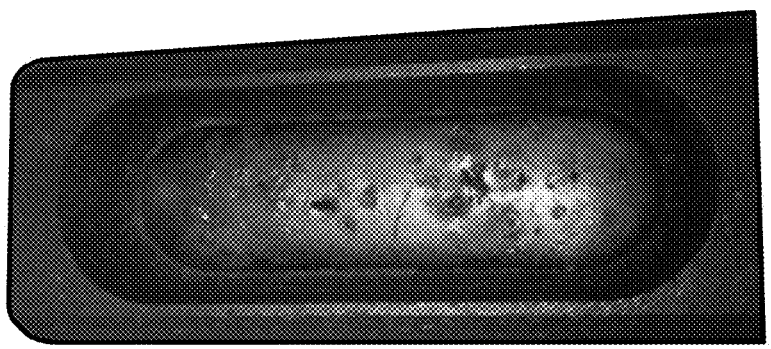
FIG. 6A shows a $CdSe_xTe_{(1-x)}$ ingot in a graphite boat.
Figure 6B:
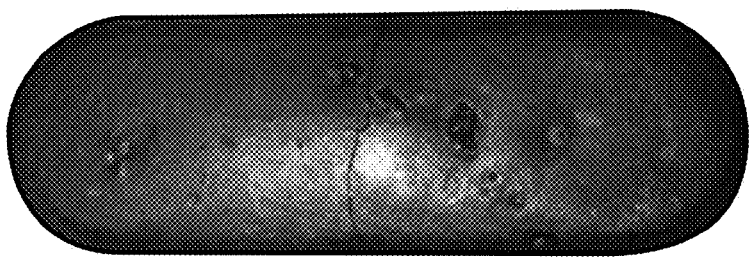
FIG. 6B shows the ingot removed from the boat.
Figure 6C:
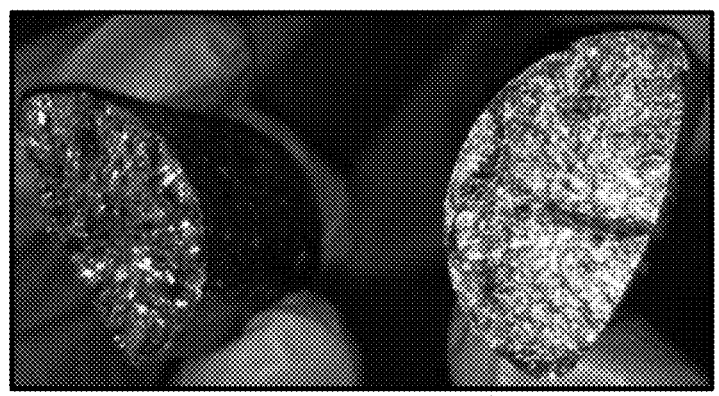
FIG. 6C shows a macroscopic view of the polycrystalline structure on the interior of the ingot.

FIG. 6A shows a $CdSe_xTe_{(1-x)}$ ingot in a graphite boat. FIG. 6B shows the ingot removed from the boat. FIG. 6C shows a close-up broken-edge view of the polycrystalline structure on the interior of the ingot.

An annealing or deoxidation step may be performed. Annealing may be accomplished by transferring the reaction products to a furnace and heating the reaction products to a high temperature for a suitable period. In some embodiments the ingot, in its first refractory vessel, is annealed. In some embodiments the ingot is crushed or milled into particulates which are placed into a second refractory vessel for annealing. The temperature and duration of annealing varies depending on the composition of the ingot and the desired crystal structure of the final annealed product. Specific annealing conditions are provided in more detail below and in the following Examples.

Crystal Tuning Process

Some alloys important in photovoltaic devices can have more than one crystal structure. The lattice constant of the crystal structure impacts the bandgap and other functional properties of the device. For example, CdSeTe, CdSe, CdZnTe, CdHgTe, CdSTe, ZnCdSe and GaAsAl are all semiconductor alloys useful in photovoltaic devices that have "tunable" crystal structures.

Figure 9:
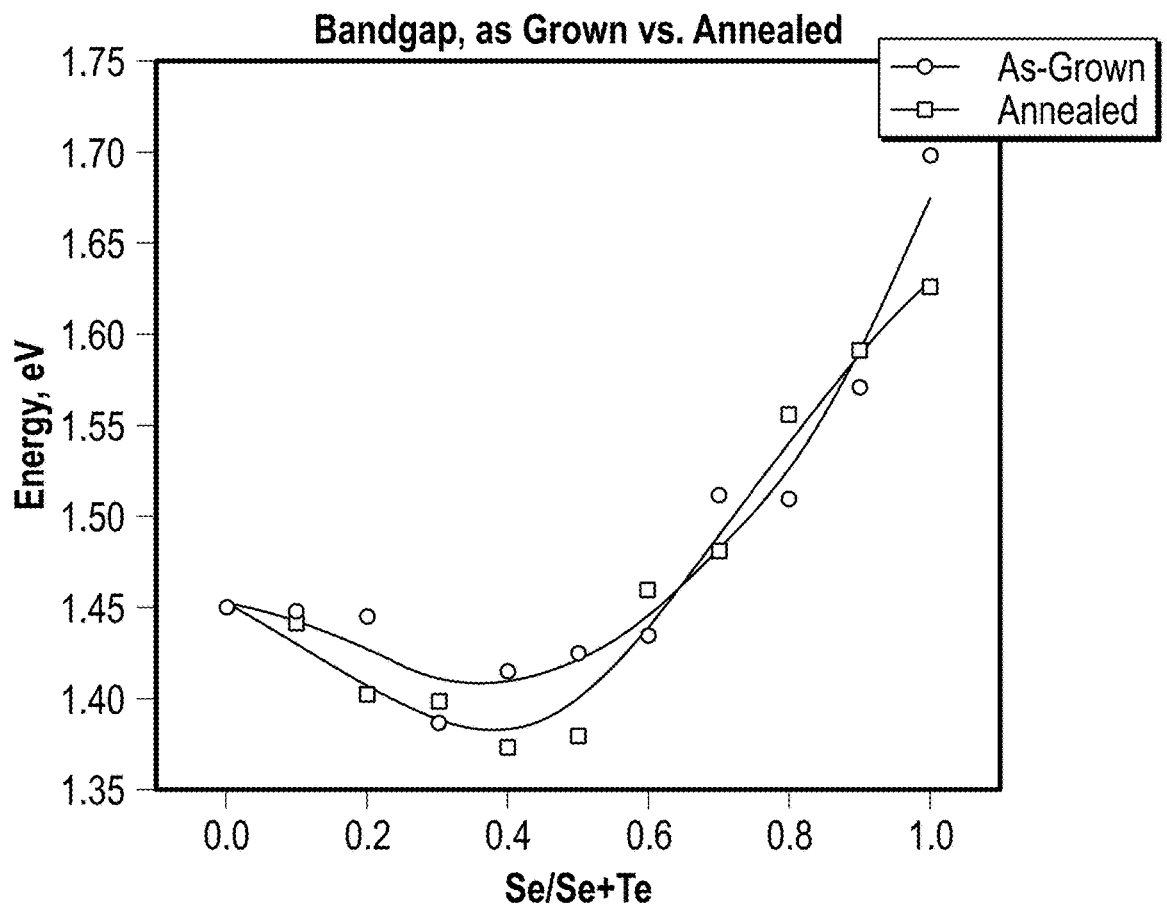
FIG. 9 shows a graph comparing the bandgap electrical properties of a $CdSe_xTe_{(1-x)}$ LAPS alloy with and without annealing at various ratios of Se:Te.

For example, CdSe and CdSeTe alloys exist in both cubic and hexagonal phase, the different crystal structure results in differing electrical properties with regard to bandgap, the hexagonal phase having a higher bandgap. The crystal structure and bandgap for CdSeTe alloys can be modulated or tuned in several ways, including but not limited to the Se concentration, the presence of dopants, the formation or growth rate, the formation temperature, or an annealing temperature. FIG. 9 illustrates how two of these tuning methods result in altered electronic properties, such as modulating the bandgap. In FIG. 9, the circle data points and curve represent the 'as-grown' bandgap, and the square data points and curve represent the 'annealed' bandgap. By altering the Se content of the exemplary ternary alloy $CdSe_xTe_{(1-x)}$ the bandgap can be tuned from a low point at about x=0.4 to a high point at about x=0.99; and this is true for both the 'as grown' and 'annealed' alloys. Thus the composition of the alloy—i.e. the relative amounts of various components—can result in a "coarse" tuning of the electrical properties.

Figure 2:
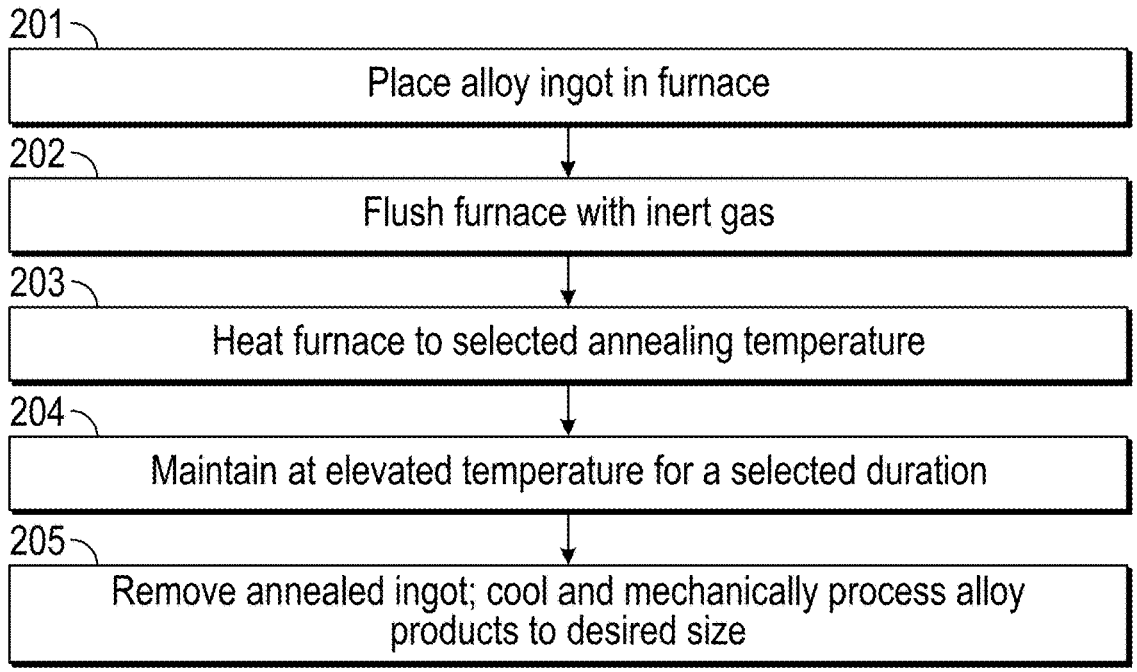
FIG. 2 a schematic representation of an embodiment of an annealing process.

An annealing process may also be used to "tune" the crystal structure of the alloy products and to de-oxidize and purify the products. An exemplary process is depicted in FIG. 2. The annealing process involves placing refractory vessels containing the reaction product from the LAPS process into a furnace 201 in an inert environment 202 and applying heat 203. An elevated temperature is maintained for a selected duration 204. The application of heat ceases. The ingot cools to near ambient temperature and is removed from the furnace 205.

Annealing process parameters have effects on structural, morphological, optical, and electrical properties as well. Still referring to the exemplary ternary alloy of FIG. 9, it can be seen that the 'annealed' bandgap is lower than 'as grown' for x ranging from about 0.1 to about 0.6; i.e. from about 10% to about 60% Se/(Se+Te) ratio. Annealing conditions may provide another method for "fine tuning" the electrical properties. In some embodiments, a pre-annealing crystal structure is a combination of cubic and hexagonal crystals and a post-annealing crystal structure has an increased proportion of cubic crystals. In some embodiments, a pre-annealing crystal structure is a combination of cubic and hexagonal crystals and a post-annealing crystal structure has an increased proportion of hexagonal crystals. Bandgap may be "tuned" by Se content and annealing conditions to a range from about 1.35 to about 1.65 eV.

By using the annealing process on the high-quality product of the LAPS process, large quantities of high-quality alloys with predictable crystal structure can be efficiently fabricated in high yield. In particular, a LAPS produced ingot, with mixed crystalline phases at room temperature, is subjected to annealing at temperatures selected to manipulate the phase distribution. In some embodiments an alloy is annealed at a temperature of about 700° C. or a temperature in the range of 500-800° C. in order to produce an increase in the cubic phase and thereby lower the bandgap. For example, a $CdSe_xTe_{(1-x)}$ alloy may be made by annealing the alloy while maintaining a temperature of 500-750° C. for a duration of 2-24 hours, thereby tuning the crystal phase structure of the alloy to form an ingot having a predominantly cubic phase of cadmium selenide telluride.

In other embodiments an alloy is annealed at a temperature of about 860° C. or a temperature in the range of 800-1100° C. to produce an increase in the hexagonal phase and thereby raise the bandgap. In some embodiments the alloy comprises cadmium and selenium. In some embodiments the alloy consists essentially of cadmium, selenium, and tellurium.

In some embodiments, the temperature during the process may range from about 200° C. to about 1100° C., or from about 300° C. to about 950° C. In some embodiments, the reaction product remains in the furnace for a period of time sufficient to remove oxygen, unreacted reactants, and impurities, alter the crystal structure, and/or re-balance the stoichiometry. In some embodiments, this process may take from about 0.5 hours to about 15 hours. In some embodiments, this process may take from about 1 hour to about 10 hours.

In an embodiment, the method of forming the $CdSe_xTe_{(1-x)}$ alloy further comprises actively cooling the pressurized reaction chamber during and/or at the completion of the self-propagating reaction. However, slower cooling while in the anneal furnace may favor the CdSeTe hexagonal crystal phase.

In some embodiments, the controlled environment in the furnace is an inert environment. In some embodiments, the controlled environment is an inert and reducing environment. In some embodiments the inert environment is nitrogen and the reducing environment includes hydrogen.

A third way to "tune" the crystal structure is through dopants. A variety of dopants have been introduced in the $CdSe_xTe_{(1-x)}$ alloy to evaluate the impact on the phase structure and bandgap variation in polycrystalline $CdSe_xTe_{(1-x)}$. The phase structure can be manipulated by dopants due to the lattice strain. The electronic properties, e.g. bandgap, can also be modified using the dopants. Dopants may be used in concentrations up to about 1 wt %.

One example is chlorine at 1% doped to $CdSe_xTe_{(1-x)}$ powder. Cl introduction reduces the lattice parameter in the cubic $CdSe_{0.2}Te_{0.8}$. Another example is Cl doped $CdSe_{0.4}Te_{0.6}$ powders, which enhances lattice parameters such as lattice constant. An example has the formula $CdSe_{0.3}Te_{0.69}Cl_{0.01}$.

Figure 10A:
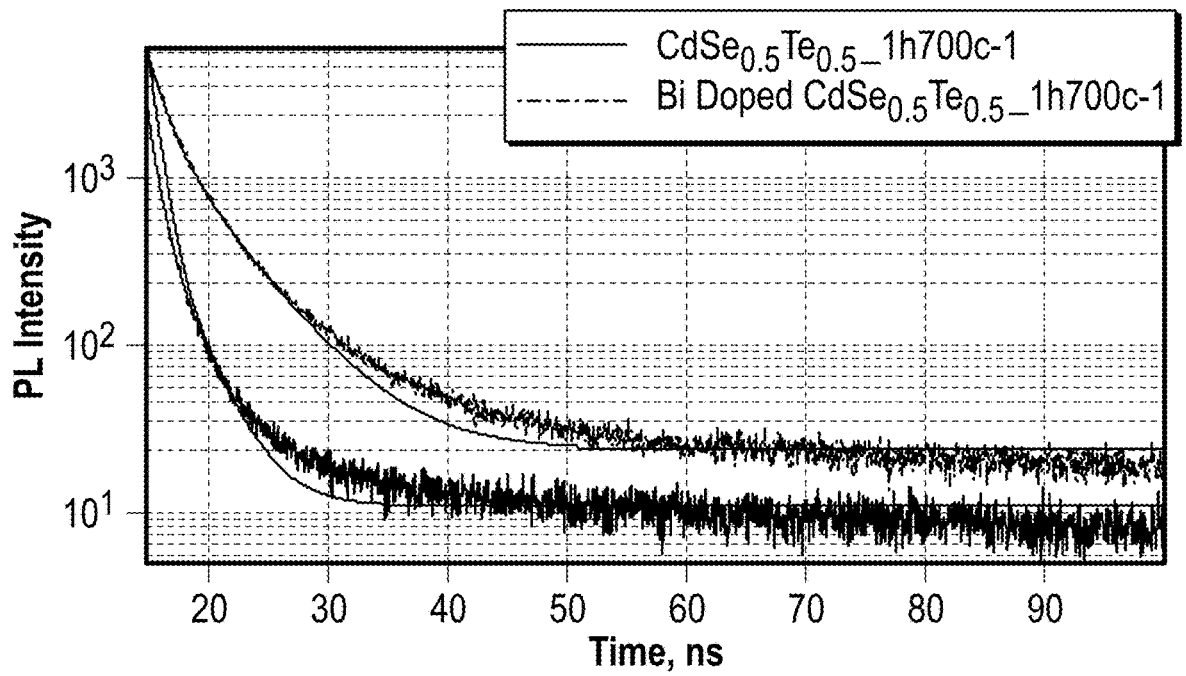
FIGS. 10A and 10B show comparative properties of $CdSe_{0.5}Te_{0.5}$ (green line—bottom) with a Bi doped $CdSe_{0.5}Te_{0.5}$ (blue line—top)
Figure 10B:
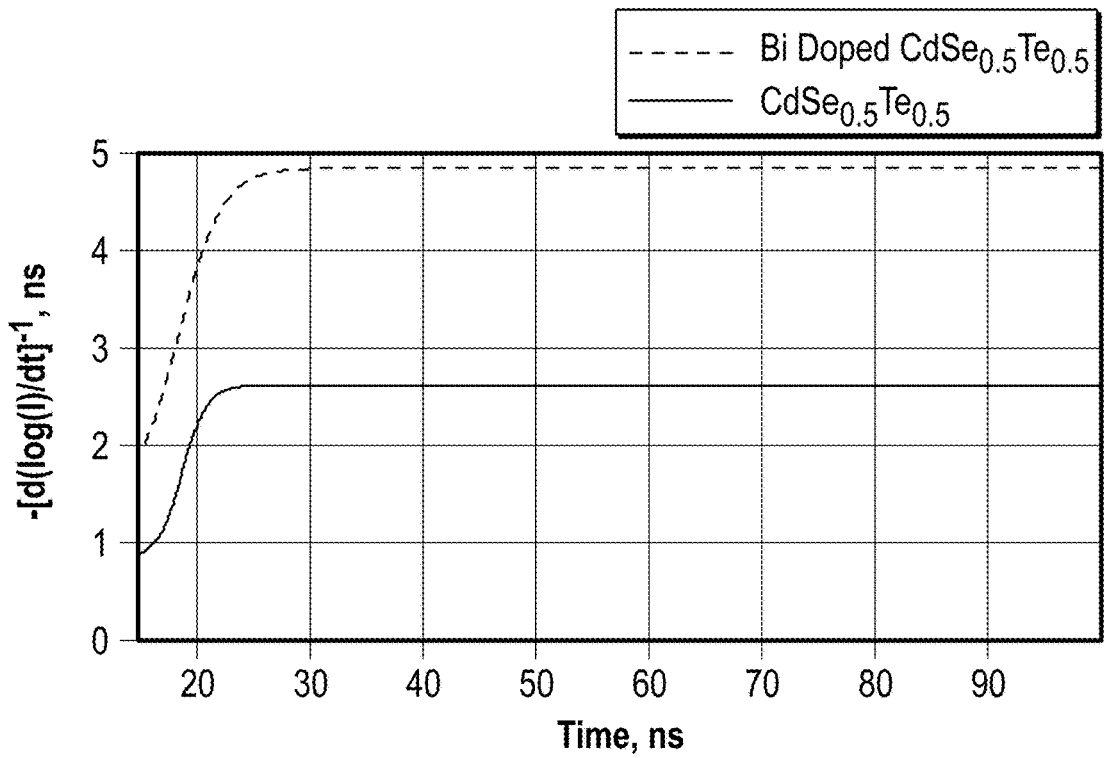
Figure 11:
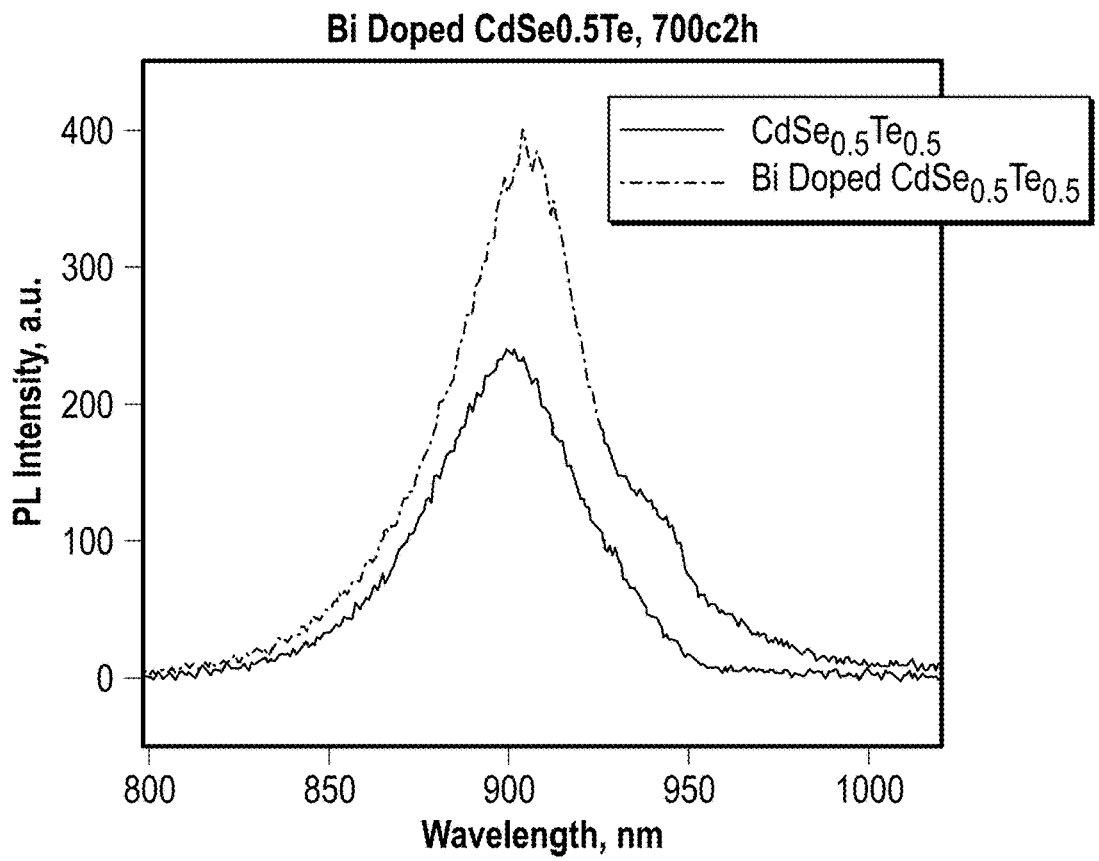
FIG. 11 shows comparative properties of doped and undoped LAPS-SHS alloy with annealing; $CdSe_{0.5}Te_{0.5}$ (blue line—bottom) and Bi doped $CdSe_{0.5}Te_{0.5}$ (red line—top).

Another doping example is Bismuth. Cubic Bi doped $CdSe_{0.5}Te_{0.5}$ can be synthesized. FIG. 10 shows comparative properties of $CdSe_{0.5}Te_{0.5}$ (green line—bottom) with a Bi doped $CdSe_{0.5}Te_{0.5}$ (blue line—top). As illustrated in FIG. 10, the time-resolved photo-luminescence indicates that the Bi doping can improve the carrier lifetime (fast tau1 from 0.8 to 1.4 ns, slow tau2 from 2.6 to 4.8 ns). FIG. 11 shows a comparative properties of doped and undoped LAPS-SHS alloy with annealing; $CdSe_{0.5}Te_{0.5}$ (blue line—bottom) and Bi doped $CdSe_{0.5}Te_{0.5}$ (red line—top). As shown in FIG. 11, the Bi doped $CdSe_{0.5}Te_{0.5}$ shows a wider PL spectrum, which indicates a higher light absorption. Selection of dopant may push the boundaries of the band gap tuning even further than Se content and anneal temperature alone can do. For example, some dopants (e.g. zinc or magnesium) will raise the bandgap—say from 1.65 up to about 1.8; whereas other dopants (e.g. silver or silicon) will lower the bandgap—say from 1.35 down to about 1.1.

Optional Post Processing

Optionally, the reaction product or annealed product may be crushed, ground, milled, or otherwise processed to any desired size for use in the manufacture of photovoltaic devices. In some embodiments, the products are jaw crushed and may be sieved for more uniform sizes. In this second milling process, sieves may be used to restrict particle sizes to a more desired and more uniform size distribution. Notably, particles that are too small (known as "fines") and particles that are too large for a desired distribution may potentially be re-used in the SHS process as quenchant particles, thereby reducing waste.

For example, the deoxidized material, which may be in the form of ingot(s), is sequentially reduced in size from about millimeter sized clusters to below 250 μm by sending through an suitable combination of comminution equipment (e.g. jaw crushers, roller mill, ball mill, etc.). Depending on the product size required, the material can be passed through sieves (e.g. 60 and 200 mesh (which correspond to 250 and 74 μm)) to produce the desired particle size distribution.

Example 1: Laser-Initiated, High-Pressure Reaction—CdSeTe

Provided are exemplary methods and devices for producing a cadmium selenide telluride alloy ($CdSe_xTe_{(1-x)}$, x=0~1). The alloy composition may be controlled to produce alloys with varying ratios of constituent elements, for example:

Cd+Se=CdSe     CdSe:

Cd+0.1Se+0.9Te=$CdSe_{0.1}Te_{0.9}$     CdSe0.1Te0.9:

Cd+0.5Se+0.5Te=$CdSe_{0.5}Te_{0.5}$     CdSe0.5Te0.5:

Cd+0.9Se+0.1Te=$CdSe_{0.9}Te_{0.1}$     CdSe0.9Te0.1:

Cd+Te=CdTe     CdTe:

In an embodiment, about 2 kg of fine reactant particles of cadmium, selenium, and tellurium were well mixed and placed in a refractive vessel. The particles had a size of approximately 50 μm. The reactant particles were provided in a ratio of 10:4:6 for Cd, Se, and Te, respectively.

The filled vessel was placed into a LAPS chamber. The chamber was pressurized with nitrogen gas to a pressure of about 50 bar (5,000 KPa) or about 700 psi (4825 KPa). A laser beam was directed at the reactant particles on the surface and near the longitudinal center of the refractory vessel using a 12 W 532 nm green laser.

The laser initiated the self-propagating reaction and was shut off after the reaction initiated. The reaction completed after a duration of less than 20 seconds. Water was circulated through a cooling jacket of the vessel around the pressure chamber. The water entering the jacket had a temperature of approximately 20° C. The vessel was cooled and depressurized.

Figure 7:
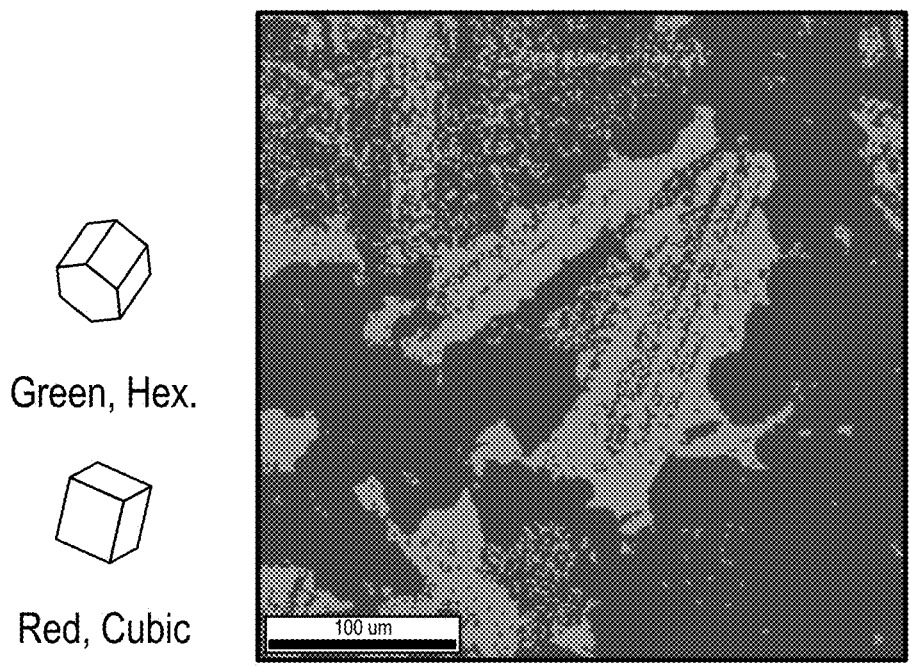
FIG. 7 shows a representation of the crystal structure of a segment of a $CdSe_xTe_{(1-x)}$ ingot produced by LAPS.

From this process, an ingot of $CdSe_{0.4}Te_{0.6}$ alloy was produced. The crystal structure, characterized using X-ray diffraction, of the as-grown ingot is shown in FIG. 7. The ingot produced by this method had a mixed crystal structure having both hexagonal and cubic phase. The cubic phase was 71.8% and the hexagonal phase was 28.2% of the structure.

Experimental data using the LAPS process for CdSeTe alloys show consistent crystal structure based on the amount of Se relative to Te (See FIG. 9). For an alloy of $CdSe_xTe_{(1-x)}(0 \leq x \leq 1)$ produced by LAPS, the crystal structure is predominantly cubic in low selenium compositions where x<0.3, the crystal structure is predominantly hexagonal in high selenium compositions where x>0.5, and mixed phase crystal structure is produced when the composition has a mid-range level of selenium where 0.3<x<0.5. The stoichiometry is reliable and the crystal phase produced can be tuned by controlling the ratios of reactants.

Also provided is a method of forming a cadmium alloy having an atomic composition of $CdSe_xTe_{(1-x)}$, wherein x is between 0.2 and 0.99, and having a manipulated crystalline structure between cubic and hexagonal structure, comprising: blending Cadmium, Tellurium, and Selenium powders with a particle size range from 1 to 200 μm to form a blended mixture; heating a localized portion of the blended mixture in a pressurized reaction chamber to initiate a self-propagating reaction in the mixture, thereby forming an ingot; annealing the ingot at a stabilizing temperature to form the alloy; and tuning the bandgap to a selected value within the range 1.35 and 1.65 eV, wherein the tuning comprises selecting the value of x and the annealing temperature, wherein bandgap is lowered by annealing at a temperature less than 750° C., wherein bandgap is increased by annealing at a temperature greater than 860° C., wherein bandgap is lowered by selecting a value for x less than 0.5, and wherein bandgap is increased by selecting a value for x greater than 0.5, thereby forming the alloy with the selected bandgap value.

Example 2: Post-Synthesis Control of Polycrystalline Structure

A $CdSe_{0.4}Te_{0.6}$ ingot produced by the LAPS process, as described above, was placed into a furnace. An inert atmosphere of nitrogen gas was introduced into the furnace at ambient pressure. The ingot was heated at 700° C. for about 10 hours.

Figure 8:
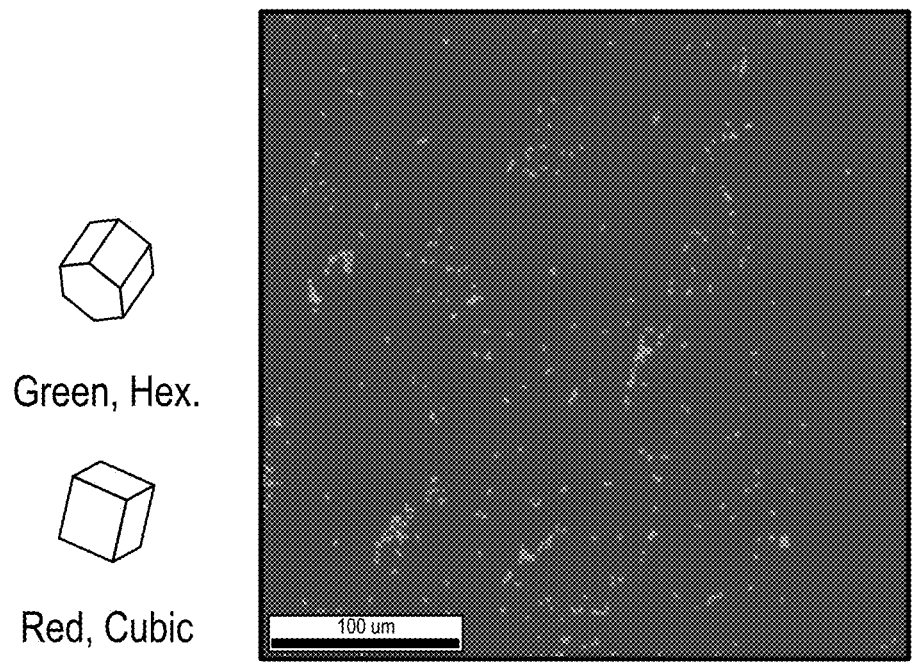
FIG. 8 shows a representation of the crystal structure of a segment of a $CdSe_xTe_{(1-x)}$ ingot produced by LAPS and annealed to manipulate the crystal structure to produce high cubic phase.

The crystal structure, characterized using X-ray diffraction, of the annealed ingot is shown in FIG. 8. The ingot produced by this method had a mixture of hexagonal and cubic phase with predominantly cubic phase. The cubic phase was 98.6% and the hexagonal phase was 1.4% of the structure. Using an ambient-pressure furnace process for the synthesis, rather than LAPS, it was not possible to produce this level of cubic phase, even with more than 30 hours of annealing.

Using post-synthesis annealing, the crystal phase produced can be tuned by controlling the annealing temperature. Using LAPS, the yield can be more than 99.5%, with measured yields of about 99%. The LAPS compounding is very fast (~20 seconds) supporting high throughput manufacturing. The ingot density is very high, close to the theoretical density (>95%). Using LAPS in conjunction with post-synthesis annealing provides methods for tuning the crystal structure and efficiently producing a high quality alloy.

In an embodiment, the method further comprises: loading the alloyed ingot into a furnace and annealing the alloyed ingot by maintaining a selected temperature for a selected duration. In an embodiment, the annealing temperature is selected from the group consisting of: about 700° C.; about 900° C.; 650-750° C.; 500-750° C.; 860-1100° C.; 600-750° C.; 650-950° C.; and 400-1500° C. In an embodiment, the annealing duration is selected from the group consisting of: about 5 hours; about 8 hours; about 10 hours; 2-10 hours; 6-12 hours; 2-24 hours; and 1-36 hours.

The cubic phase can be manipulated and stabilized at a high percentage of selenium, up to ~100% by annealing for a relatively short time at a low temperature. Of particular significance is synthesis of cubic CdSe and CdSeTe in which Se>Te, these alloys are typically produced as a powder with predominantly hexagonal phase crystal structure.

Combining control of the Se concentration in $CdSe_{(x)}Te_{(1-x)}$ alloys and the stabilization process, the bandgap can be manipulated in a wide range (1.4 to 1.7 eV at room temperature). With introducing secondary dopants, still further change in the phase structure and engineering the bandgap in a wider range can be achieved. These methods can be applied to mass produce high quality powders with tunable bandgap. The bandgap bowing character in $CdSe_xTe_{(1-x)}$ alloys has been determined based on the Se concentration and phase structure using room temperature Photoluminescence (PL) and UV-Vis optical spectra measurements.

Provided is an ingot of a cadmium alloy having an atomic composition of $CdSe_xTe_{(1-x)}$, wherein x is between 0 and 1, and having a manipulated crystalline structure between cubic and hexagonal structure.

In an embodiment of the $CdSe_xTe_{(1-x)}$ alloy, the alloy has a crystalline structure that is at least 95% cubic, as measured by electron backscatter diffraction (EBSD) analysis of an average cross-section of the ingot.

In an embodiment of the $CdSe_xTe_{(1-x)}$ alloy, x is between 0.20 and 0.99 and the crystal phase manipulated to a phase selected from the group consisting of: 80-100% cubic; 80-90% cubic; greater than 80% cubic; greater than 85% cubic; greater than 90% cubic; greater than 95% cubic; greater than 98% cubic; and greater than 99% cubic.

In an embodiment of the $CdSe_xTe_{(1-x)}$ alloy, x is greater than about 0.30 and the crystalline structure is at least 90% cubic. In an embodiment of the $CdSe_xTe_{(1-x)}$ alloy, x is greater than about 0.40 and the crystalline structure is at least 90% cubic. In an embodiment of the $CdSe_xTe_{(1-x)}$ alloy, x is greater than about 0.50 and the crystalline structure is at least 90% cubic.

In an embodiment of the $CdSe_xTe_{(1-x)}$ alloy, x is between 0.25 and 0.75 and the band gap of the alloy is less than about 1.45 eV. In an embodiment of the $CdSe_xTe_{(1-x)}$ alloy, x is between 0.25 and 0.75 and the band gap of the alloy is less than about 1.40 eV. In an embodiment of the $CdSe_xTe_{(1-x)}$ alloy, x is between 0.4 and 0.6 and the band gap of the alloy is less than about 1.45 eV. In an embodiment of the $CdSe_xTe_{(1-x)}$ alloy, x is between 0.4 and 0.6 and the band gap of the alloy is less than about 1.40 eV.

In an embodiment of the $CdSe_xTe_{(1-x)}$ alloy, the bandgap is less than about 1.45 eV. In an embodiment of the $CdSe_xTe_{(1-x)}$ alloy, the bandgap is a value within the range of 1.35 and 1.65 eV. In an embodiment of the $CdSe_xTe_{(1-x)}$ alloy, the bandgap of the alloy is less than about 1.45 eV but more than 1.4 eV. In an embodiment of the $CdSe_xTe_{(1-x)}$ alloy, the bandgap of the alloy is more than about 1.45 eV, in $CdSe_xTe_{(1-x)}$, when x is between 0.6 and 1.0, and the hexagonal phase is predominant.

Also provided is a method of forming a cadmium alloy, comprising: heating a localized portion of a blended mixture of solid particles of cadmium and particles of at least one second element in a pressurized reaction chamber to initiate a self-propagating reaction in the mixture, thereby forming the alloy.

Another embodiment is a method of making an ingot of cadmium alloy having an atomic composition of $CdSe_xTe_{(1-x)}$, wherein x is between 0 and 1, and having a manipulated crystalline structure between cubic and hexagonal structure, the method comprising: identifying a desired bandgap value in the range of 1.1 to 1.8 eV; coarse tuning the bandgap by selecting a value for x, wherein a value for x less than 0.5 corresponds to a bandgap between about 1.35 and 1.50, and wherein a value for x greater than 0.5 corresponds to a bandgap between 1.40 and 1.65; blending Cadmium, Tellurium, and Selenium powders according to the formula $CdSe_xTe_{(1-x)}$ with particles size from 1 to 200 μm to form a blended mixture; heating a localized portion of the blended mixture in a pressurized reaction chamber to initiate a self-propagating reaction in the mixture, thereby forming an ingot; fine tuning the bandgap of the formed ingot, wherein the fine tuning comprises annealing the ingot at a selected stabilizing temperature; and wherein the fine tuning comprises: selecting an annealing temperature to manipulate the crystal structure, whereby bandgap may be lowered by about 0.02 eV by annealing at a temperature of about 500-750° C., or the bandgap may be increased by about 0.02 eV by annealing at a temperature of about 860-1100° C.; thereby forming the alloy with the selected bandgap value.

In a further embodiment, the bandgap may be engineered even further up or down by the inclusion of specific dopants, X into the ternary $CdSe_xTe_{(1-x)}$ alloy to form a $CdSe_xTe_{(1-x)}$:X doped alloy. Selection of a dopant, X, from either Zn or Mg can push the band gap to ranges above 1.65, up to about 1.8. Conversely, selection of a dopant, X, from either Si or Ag can push the band gap to ranges below 1.35 down to about 1.1.

Example 3: Laser-Initiated, High-Pressure Reaction—CdS

Figure 12:
FIG. 12 shows CdS produced by SHS in a furnace at ambient pressure.

Cadmium Sulfide is a poor candidate for traditional SHS reaction processing. It has a very high heat of reaction that results in an adiabatic temperature well in excess of the boiling point of the product. Further, its melting point is higher than its boiling point at ambient pressure (i.e. CdS sublimes at atmospheric pressure). Because a molten state cannot be reached at ambient pressure, a fine powder, not a granular product, is made in an unmodified SHS reaction. An example of a CdS ingot composed primarily of powder product is shown in FIG. 12. The atmospheric pressure reaction resulted in a product composed almost entirely of fine dust particles with a 77% raw material yield.

The LAPS process overcomes these challenges to produce polycrystalline CdS ingots. The process is performed at a pressure high enough to achieve a molten CdS state (approximately 10 bar, 1000 KPa). Due to the high adiabatic temperature and relatively low boiling point, high pressures are helpful for the LAPS process to achieve good yields in the resulting CdS ingot. In certain embodiments, the reactor chamber pressure has a pressure value selected from: greater than 20 bar (2,000 KPa), greater than 30 bar (3,000 KPa), 20-100 bar (2,000-10,000 KPa), and about 50 bar (5,000 KPa).

The last major challenge for the CdS system is that the boiling points of the raw materials are much less than the melting point of the final product, which makes it difficult to prevent unreacted components, particularly sulfur, from vaporizing during the reaction. Therefore, in order to maximize the reaction yield, it is helpful to use very fine, powder-like reactant particulates with high surface area that are well blended.

Figure 13:
FIG. 13 shows CdS produced by LAPS at elevated pressure.

In an embodiment, the LAPS process, using a 532 nm laser to initiate the CdS reaction inside a pressure vessel, produced a large polycrystalline CdS ingot having micron-sized crystallites and with greater than 90% raw material yield. An example of the CdS ingot formed by LAPS is depicted in FIG. 13. The pressurized reaction produced a polycrystalline ingot with fine dust only on the ingot surface and a 98% raw material yield. Such an ingot is suitable for further processing into a free-flowing powder using traditional milling and sieving processes.

Example 4: Laser-Initiated, High-Pressure Reaction—CdSe

The reaction of Cd with Se is highly exothermic. Typically, reacting the two powders results in yields of 30% or less, along with the potential safety concerns associated with violent exothermic reactions.

As discussed with the CdSeTe alloy (CdSe=$CdSe_1Te_0$), the LAPS process produced CdSe ingots with increased yield, density, and purity. Using the LAPS process with annealing, the hexagonal or cubic phases can be manipulated and stabilized by annealing at different temperatures.

Example 5: Laser-Initiated, High-Pressure Reaction—CdTe

Cadmium Telluride is a nearly ideal compound for SHS production. It combines a reasonably high boiling point of the product with a lower heat of reaction that results in an adiabatic temperature sufficient to fully melt the product. The primary downside is the low boiling point of the product in comparison to the melting point. This results in a need to add fine CdTe powder (20-25 wt %) to the reactant mixture in order to reduce product loss during the reaction when performed at or near atmospheric pressure, however, using LAPS, high yields are produced without or with minimal use of fines.

Using LAPS, a fully melted CdTe ingot with nearly 100% Te yield was produced using 2 atom % excess Cd and no CdTe fines. In one embodiment, the particulates were ignited at about 300 psig in a $N_2$ atmosphere with a 10 W 1064 nm laser (IPG Photonics, Oxford, Mass.). In another embodiment, the particulates were ignited at about 300 psig in a $N_2$ atmosphere with a 12 W 532 nm laser (TYKMA, Chillicothe, Ohio).

Example 6: Laser-Initiated, High-Pressure Reaction—ZnTe

Zinc Telluride has been produced. Zinc Telluride is a good compound for SHS production for similar reasons as CdTe. It also shares the same drawback of low boiling point compared to melting point. Due to the high heat of reaction, a higher content of quenchant particles is helpful to include with the reactants to control the reaction and maintain high yields.

In an embodiment, a 532 nm laser was used to initiate the ZnTe reaction inside a pressure vessel. The raw material mixture uses a 1:1 atomic ratio of Zn and Te and 10-25 wt % ZnTe powder to control the reaction. The LAPS method for ZnTe production uses a reduced quantity of fines or quenchant particles as compared with an unmodified SHS reaction. However, due to the high heat of reaction, it is helpful to incorporate some quenchant particles with the reactant particles to improve the yield, or a pressure greater than 300 psig may be used to achieve a higher density ingot.

Example 7: Laser-Initiated, High-Pressure Reaction—CdSTe

Cadmium-Sulfur Telluride Alloy has been produced. In compositions in which the sulfur is less than 5%, the material properties and production technique are similar to that of CdTe. Although it is possible to use elemental sulfur as a raw material for producing CdSTe alloys, it beneficial to add CdS powder to the raw material blend, rather than elemental sulfur, prior to reacting in order to minimize sulfur loss.

In a furnace-induced ambient pressure process the raw material mixture uses a 1:1 atomic ratio of Cd and Te and a lower amount of CdTe fines (10-15 wt %) in order to compensate for the addition of CdS, which, like the CdTe fines, acts as a quenchant during the reaction. The ratio of Cd and Te is also 1:1 in the LAPS process. Using the LAPS process, the addition of CdTe fines is optional when the reaction is conducted at sufficient pressure. In one embodiment, the reaction is performed at 300 psig with 5-25 wt % CdS and no CdTe fines.

The foregoing description of the various aspects and embodiments of the present invention has been presented for purposes of illustration and description. It is not intended to be exhaustive of all embodiments or to limit the invention to the specific aspects disclosed. Obvious modifications or variations are possible in light of the above teachings and such modifications and variations may well fall within the scope of the invention as determined by the appended claims when interpreted in accordance with the breadth to which they are fairly, legally and equitably entitled.

What is claimed is:

1. A method of forming a metallic alloy comprising:
blending a mixture of particles of a first metallic substance comprising Cd, having a particle size of less than 100 µm and particles of at least one second substance comprising at least one of Se, Te, S, Hg, or Zn, having a particle size of less than 100 µm, thereby forming a blended mixture, wherein the blended mixture further comprises a quenchant, and wherein the quenchant comprises at least one of CdTe, CdSe, CdS, or ZnTe;
pressurizing the blended mixture to a pressure of about 100 to 20,000 KPa in a pressure reactor;
initiating a self-propagating reaction by directing a point energy source to a localized portion of the blended mixture inside the pressure reactor, and cooling the pressure reactor during propagation of the exothermic reaction, to remove heat generated from the reaction, thereby forming an alloyed ingot comprising the metallic alloy.

2. The method of claim 1, wherein the point energy source is a laser.

3. The method of claim 1, further comprising:
maintaining a pressure during the self-propagating reaction, wherein the pressure is selected from the group consisting of: 2,000-3,000 KPa; 1,000-5,000 KPa; 500-10,000 KPa; and 1,000-10,000 KPa.

4. The method of claim 1, wherein the blended mixture substantially comprises particles having a size selected from the group consisting of: 1-50 μm; 1-100 μm; and less than 50 μm.

5. The method of claim 1, further comprising:
loading the alloyed ingot into a furnace; and
annealing the alloyed ingot by maintaining a selected stabilizing temperature for a selected duration,
wherein the stabilizing temperature is selected from: (a) 500 to 800° C.; or (b) 800 to 1100° C.; and
wherein the duration is 2-24 hours.

6. The method of claim 1, wherein the blended mixture further comprises at least one dopant selected from the group consisting of: Bi; Cl; Cu; Sb; Hg; In; Ga; Ag; Au; Br; I; As; Pb; Na; Li; K; B; Al; Tl; Ge; Sn; P; Si; and F.

7. The method of claim 1, wherein the alloyed ingot comprising the metallic alloy comprises a $CdSe_xTe_{(1-x)}$ composition, wherein x is between 0 and 1, and having a manipulated crystalline structure between cubic and hexagonal structure.

8. The method of claim 7, wherein x is between 0.20 and 1 and wherein the crystalline structure of the $CdSe_xTe_{(1-x)}$ composition is greater than 90% cubic.

9. A method of tuning the bandgap of an alloyed ingot comprising a $CdSe_xTe_{(1-x)}$ composition, the method comprising: identifying a desired bandgap value in the range of 1.1 to 1.8 eV;
coarse tuning the bandgap by selecting a value for x, wherein a value for x less than 0.5 corresponds to a bandgap between 1.1 and 1.50, and wherein a value for x greater than 0.5 corresponds to a bandgap between 1.40 and 1.8;
blending Cadmium, Tellurium, and Selenium powders according to the formula $CdSe_xTe_{(1-x)}$ with particles size from 1 to 100 μm to form a blended mixture, wherein the blended mixture further comprises a quenchant, and wherein the quenchant comprises at least one of CdTe, CdSe, CdS, or ZnTe;
heating a localized portion of the blended mixture in a pressurized reaction chamber to initiate a self-propagating reaction in the mixture, thereby producing a formed ingot; cooling the pressure reactor during propagation of the exothermic reaction, to remove heat generated from the reaction;
fine tuning the bandgap of the formed ingot, wherein the fine tuning comprises annealing the formed ingot at a selected stabilizing temperature; and
wherein the fine tuning comprises: selecting an annealing temperature to manipulate the crystal structure, whereby the bandgap may be lowered by about 0.02 eV by annealing at a temperature of about 500-750° C., or the bandgap may be increased by about 0.02 eV by annealing at a temperature of about 860-1100° C.;
thereby forming the alloyed ingot with the selected bandgap value.

10. The method of claim 9, wherein the pressurized reaction chamber is pressurized to a pressure in a range of 100 to 20,000 KPa during the self-propagating reaction.

11. The method claim 1, wherein the pressure reactor is cooled during the self propagating exothermic reaction by means of coolant fluid circulating about the pressure reactor in a cooling jacket.

12. The method of claim 1, wherein the metallic alloy is a ternary alloy containing cadmium.

13. The method of claim 1, wherein the metallic alloy is a binary alloy containing cadmium.

14. The method of claim 1, wherein the metallic alloy is a quaternary alloy containing cadmium.

15. The method of claim 1, wherein the metallic alloy is a ternary alloy having an atomic composition of $CdSe_xTe_{(1-x)}$, wherein x is between 0.20 and 0.99.

16. The method of claim 1, wherein the quenchant comprises CdTe.

17. The method of claim 1, wherein the quenchant comprises quenchant particles having a size in a range from about 10 μm to about 300 μm, and wherein a composition of the blended mixture comprises from about 5% to about 60% quenchant by weight.

18. The method of claim 1, wherein the point energy source comprises at least one of a maser or a plasma gun.

19. The method of claim 1, further comprising:
loading the alloyed ingot into a furnace; and
annealing the alloyed ingot by maintaining a selected temperature for a selected duration,
wherein the selected temperature is in a range of 300° C. to 950° C.; and
wherein the selected duration is in a range of 0.5 hours to 15 hours.

20. The method of claim 1, wherein the quenchant comprises quenchant particles having a size in a range from about 10 μm to about 300 μm.

* * * * *